(12) United States Patent
Chuang et al.

(10) Patent No.: US 6,611,344 B1
(45) Date of Patent: Aug. 26, 2003

(54) APPARATUS AND METHOD TO MEASURE THREE DIMENSIONAL DATA

(75) Inventors: Ping Derg Chuang, Singapore (SG); Wee Lee Sim, Singapore (SG)

(73) Assignee: Rahmonic Resources Pte Ltd (SG)

( * ) Notice: Subject to any disclaimer, the term of this patent is extended or adjusted under 35 U.S.C. 154(b) by 0 days.

(21) Appl. No.: 09/856,996

(22) PCT Filed: Nov. 30, 1999

(86) PCT No.: PCT/SG99/00131
§ 371 (c)(1),
(2), (4) Date: Oct. 3, 2001

(87) PCT Pub. No.: WO00/33026
PCT Pub. Date: Jun. 8, 2000

(51) Int. Cl.$^7$ .............................................. G01B 11/24
(52) U.S. Cl. ...................... 356/601; 630/634; 630/635
(58) Field of Search ................................. 356/601, 603, 356/611, 630, 634, 635, 636, 408, 12; 250/559.19, 559.24, 559.29

(56) References Cited

U.S. PATENT DOCUMENTS 5,629,773 A * 5/1997 Wakai et al. ............... 356/601

FOREIGN PATENT DOCUMENTS

| DE | 4016796 | 2/1991 |
| JP | 09189518 | 7/1997 |
| JP | 10089960 | 4/1998 |
| JP | 11203454 | 7/1999 |
| WO | 95/00871 | 1/1995 |

OTHER PUBLICATIONS

International Search Report issued 02/00 by Australian Patent Office in corresponding PCT International Application No. PCT/SG99/00131.
*Company Profile,* Rahmonic Resources Pte Ltd. (2000).
*Summary of Semicon Backend Inspection Modules,* Rahmonic Resources Pte Ltd. (2000).
*Surface Inspection,* Rahmonic Resources Pte Ltd. (2000).
*3–D Lead Inspection for 2–Sided Devices,* Rahmonic Resources Pte. Ltd. (2000).
*Marking Inspection,* Version 05, Rahmonic Resources Pte Ltd. (Apr. 2000).
*Product Update, 36K UPH 3D Vision Inspection,* Version 05, Rahmonic Resources Pte Ltd. (Apr. 2001).

* cited by examiner

*Primary Examiner*—Frank G. Font
*Assistant Examiner*—Roy M. Punnoose
(74) *Attorney, Agent, or Firm*—Thompson Hine LLP

(57) ABSTRACT

The present invention relates to an apparatus to optically measure three-dimensional data of an object (7) to be viewed, comprising:

a light source (8) for illuminating an object to be viewed, a means (11) for generating multiple parallel bundles of parallel light rays, each of said parallel bundles of parallel light rays containing image information of the object to be viewed and said parallel bundles of parallel light rays being separated from each other;

a means (9) for collecting the light rays in said parallel bundles of parallel light rays and directing them on an imaging means;

an imaging means (2) for generating images of the incident parallel bundles of parallel light rays, wherein each image corresponds to one specific parallel bundle of parallel light rays and wherein the generated images are separated from one another in a two-dimensional imaging area (12) describable by a set of two coordinate axes;

an analyzing device (11) for extracting length, width and height information of the object to be viewed from the coordinate values of the points of incidence of corresponding light rays originating from the very same point ($h_1$) of the object (7) to be viewed but travelling in different bundles of parallel light from the object to said two-dimensional imaging area (12).

Furthermore, the invention relates to a corresponding method to optically measure three-dimensional data of an object to be viewed.

26 Claims, 35 Drawing Sheets

Left Image / Right Image / 12

Rays of image not shown

11

15

3-D view of the calibration object 15 15

End elevation of calibration object

3-D view of the wire

APPARATUS AND METHOD TO MEASURE THREE DIMENSIONAL DATA

BACKGROUND

The present invention relates to apparatuses and methods to measure three-dimensional data, namely to measure not only length and width of objects but also their height as well as their relative distance to the observer.

Humans use two eyes to measure three-dimensional (3-D) objects, for instance length, width and the third dimension—height. This third dimension can also be referred to as distance away from the viewer.

This invention presents a novel apparatus and method to measure 3-D data of length, width and height. For the purpose of this invention, the term height and distance can be used interchangeably.

In order to make the field of the invention more readily understandable the following general remarks are provided with respect to the following known apparatuses and methods to measure 3-D data:
1. Stereoscopic Vision
2. Depth from Focus
3. Laser Range Finding
4. Structured lighting
  1. Stereoscopic Vision It is well known that the measurement of two dimensions (2-D) can be performed with one eye or one view. To measure the third dimension, a second eye or a second view is required. However, a single eye can produce two or more views if the eye is moved in a corresponding position for each view or if the object is moved in position relative to the eye.

In general, numerous devices are available to measure the third dimension using the methodology of stereo vision or stereopsis. FIG. 1 shows a conventional solution using two imaging devices 1 (for instance two video cameras 2 and lenses 3) where in the paths along which the rays of light have travelled during image formation are non-parallel due to the use of conventional lenses and wherein two images of the object to be observed (one in each camera) are generated.

FIG. 2 shows another conventional solution using a single video camera 2 and lens 3 used in conjunction with a set of mirrors or prismatic mirrors 4. Again, the paths along which the rays of light travel during image formation are non-parallel. Once again, this leads to the creation of two images within the single video camera 2.

However, the known methods as explained in conjunction with FIGS. 1 and 2 which makes use of non-parallel light rays for generating at least two images of the object to be viewed are relatively complex and bulky due the number of individual components used and the space that has to be provided for the travelling non-parallel light rays.

2. Depth from Focus

It is also possible to measure the third dimension by using a single view from a single imaging sensor. This is for example performed by using an optical imaging system, for instance a microscope, with an extremely narrow depth of field. The microscope is mounted vertically on a calibrated stand. To measure the height (z-axis), the microscope is moved up and down until the point of interest is in focus. The height data on the calibrated stand provides the height measurement. Multiple points can be measured in this way. However the disadvantage of this method is the slow speed in taking measurements, as servo-mechanical means have to be used to focus the optical imaging system from one point to next. Further details may be found in FIG. 3 in which a camera 2 is shown with a lens 3 having an extremely narrow depth of field. The camera 2 and the lens 3 may be moved up and downwards relative to an object to be observed along a calibrated stand 5 with a height meter 6 indicating the temporary position of the camera 2 and the lens 3. The distance of an object to be observed corresponds to the reading on the calibrated height meter 6 where the image of the object produced by the lens and camera is in focus, i.e. not blurred or otherwise distorted.

3. Range Finding

The third dimension of distance can also be obtained by using a pulsed or amplitude modulated wave or computing the phase changes in a transmitted and reflected wave. Laser, radar and ultrasound devices (so-called sonar devices) are examples of apparatus using this art. The measurement may be based on interferometry or echo detection techniques. These techniques require expensive and highly sophisticated opto-electronic apparatus comprising inter alia transmitters, wave guiding means and receivers for the travelling waves which are directed to and reflected back by objects to be observed.

4. Structured Lighting

Structured lighting involves the projection of a light pattern on the surface of an object to be viewed and viewing the reflected light from one or more different angels, or the study of shadows as produced by the projected light. A classical example of structured lighting is a sundial.

Examples of structured lighting include the projection of a point of light, a line or a grid onto the object surface from an angle and viewing the light pattern using a video camera from a different angle. The light projection and the camera are analogous to the use of two views.

SUMMARY OF THE INVENTION

In view of the disadvantages of the above mentioned prior art techniques it is an object of the present invention to provide in addition to the known apparatuses and methods for measuring 3-D data a simplified apparatus and a simplified method for measuring three-dimensional data.

In particular it is an object of the present invention to provide an apparatus and a method for measuring 3-D data in which only a single eye or a single view are needed.

Another object of the present invention is to provide an apparatus and a method for measuring 3-D data in which there is no need for a calibrated high-precision height meter indicating the temporary position of the viewing eye.

Another object of the present invention is to provide an apparatus and a method for measuring 3-D data in which there is no need for sophisticated opto-electronical apparatus.

Yet another object of the invention is to provide an apparatus and a method for measuring 3-D data in which analyzing 3-D data may be performed with a conventional computing machine such as a standard micro-processor based personal computer without the need for extremely high computational power required for performing highly complex and time consuming mathematical operations for extracting relevant 3-D object data such as length, width and height from image data provided by an imaging means.

These objects are accomplished by an apparatus according to independent apparatus claim 1 and a method according to independent method claim 2.

The dependent claims relate to further advantageous embodiments of the present invention.

The features and advantages of the present invention will be more readily apparent from the following detailed discussion of preferred embodiments in conjunction with the enclosed drawings:

BRIEF DESCRIPTION OF THE DRAWINGS

FIG. 5($b$) shows the functional equivalence of the apparatus shown in FIG. 4 if two cameras are used;

FIG. 16($b$) shows an integrated light source as used in an integrated light-mounting feature shown in FIG. 16($a$) which uses an appendum of discrete LEDs or a continuous strip of fiber light;

FIG. 28($b$) shows the side view of the semiconductor device shown in FIG. 28($a$) and highlights the height variation in the leads;

DETAILED DESCRIPTION OF THE PREFERRED EMBODIMENTS

Figure 4:
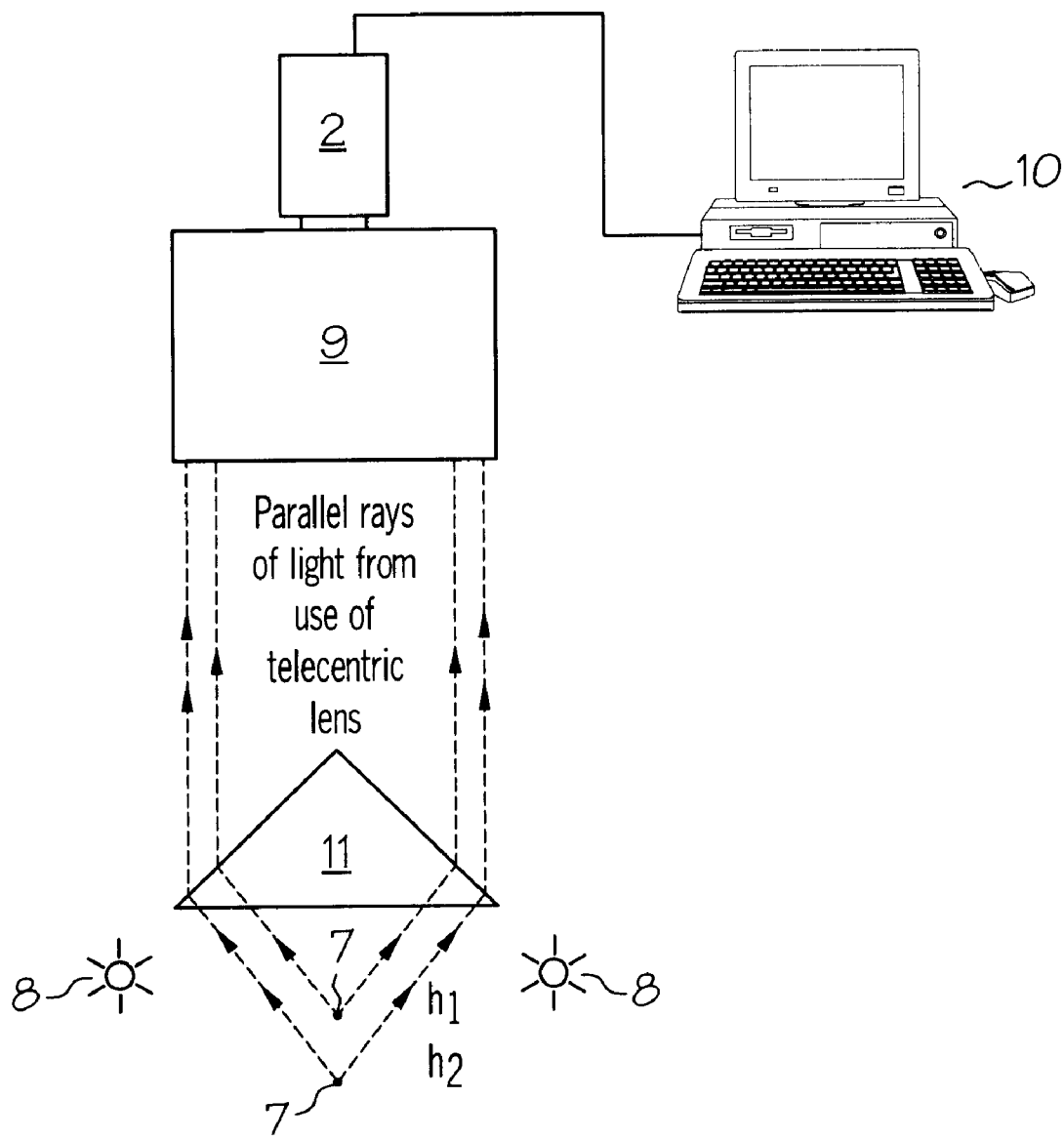
FIG. 4 shows an apparatus for measuring 3-D dimensional data according to the invention.

FIG. 4 shows a apparatus to measure three-dimensional data according to the invention which consists of:

a light source 8 for illuminating an object 7 to be viewed, a stereo image beam splitter 11 as means for generating multiple parallel bundles of parallel light rays emitted from the illuminated object 7, each of said parallel bundles of parallel light rays containing image information of the object 7 to be viewed and said parallel bundles of parallel light rays being separated from each other, a telecentric lens 9 as means for collecting the light rays in said parallel bundles of parallel light rays and directing them on an imaging means;

an imaging sensor and image formation device such as a video camera 2 as imaging means for generating images of the parallel bundles of parallel light rays, wherein each image corresponds to one specific parallel bundle of parallel light rays and wherein the generated images are separated from one another in a two-dimensional imaging area describable by a set of two coordinate axes;

an analytical device 10 making use of analytical device software as analyzing device for extracting length, width and height information of the object to be viewed from the coordinate values of the points of incidence of corresponding light rays originating from the very same point of the object 7 to be viewed but travelling in different bundles of parallel light from the object to said two-dimensional imaging area.

Figure 14:
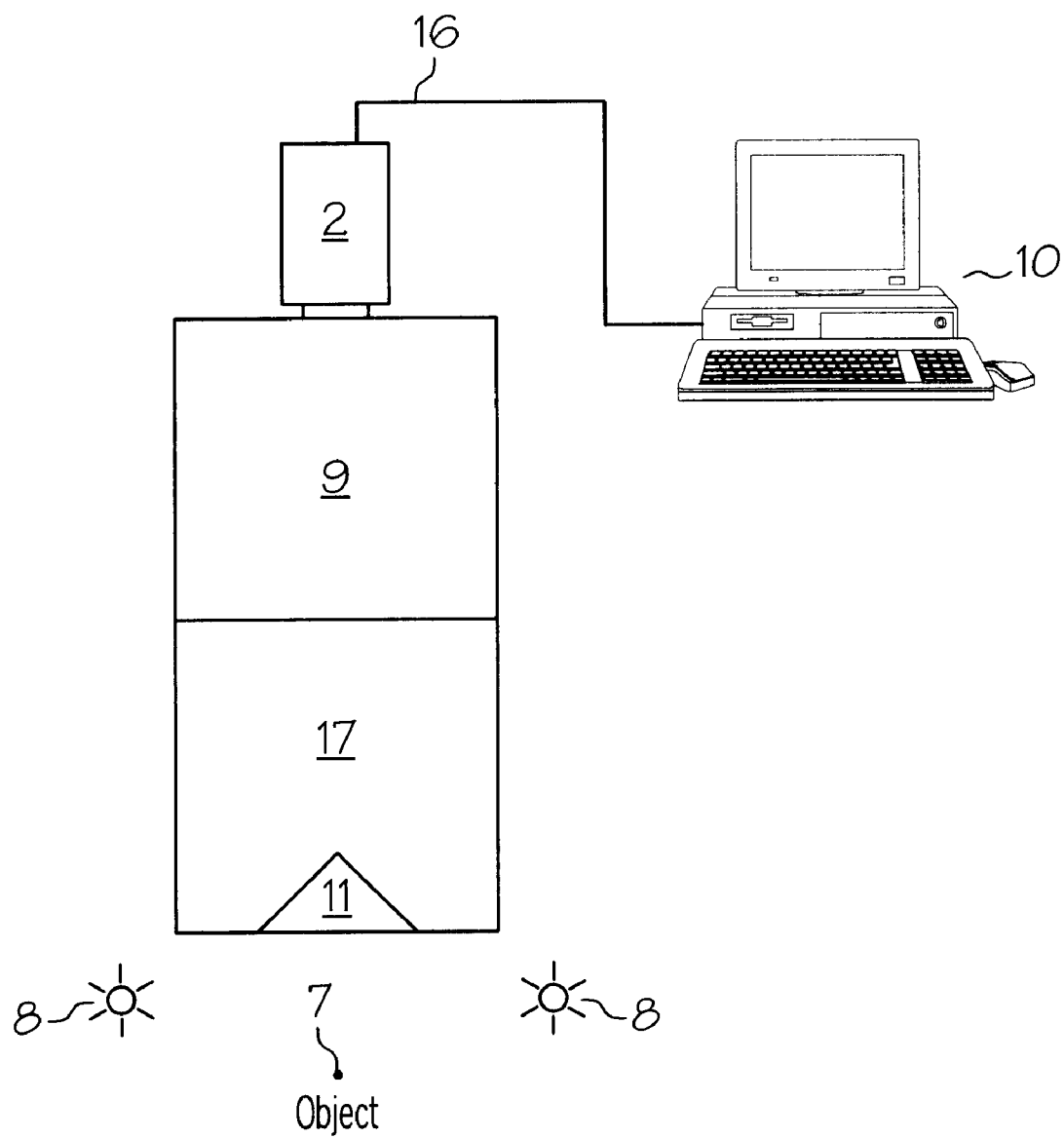
FIG. 14 shows a preferred embodiment of a completely assembled apparatus according to the invention.

A preferred embodiment of the apparatus according to the invention is shown in FIG. 14, wherein a micro-processor based personal computer 10 is connected to a video camera 2 via an interface cable 16. The video camera 2 has a telecentric lens 9 attached thereto. A wedge shaped prism serving as stereo image beam splitter 11 is aligned and attached to the telecentric lens 9 using a barrel extension 17. An object 7 to be viewed illuminated with a light source 8.

Image information contained in the parallel bundles of parallel light rays passing through opposite sides of the stereo image beam splitter 11 is displayed in different parts of an imaging area in the video camera 2 and subsequently transferred via the interface cable 16 to the PC 10 where the analytical results are shown on the PC and appropriate actions taken.

Imaging Sensor and Image Formation Device

This invention utilises either a one-dimensional (1-D) or two-dimensional (2-D) imaging sensor to sense the formation of the image as formed on an imaging plane. The imaging sensor used is one with a multitude of pixels, with each pixel sensing the intensity of the formed image. Any sensor of visible and non-visible light that serves this purpose can be used. Examples of such sensors are a video camera, a line scan camera and an X-ray imaging sensor.

The parallel rays of light as shown depict the paths travelled by the light with the use of a telecentric lens. There is no parallax or perspective distortion with the use of the telecentric lens 9.

Figure 1:
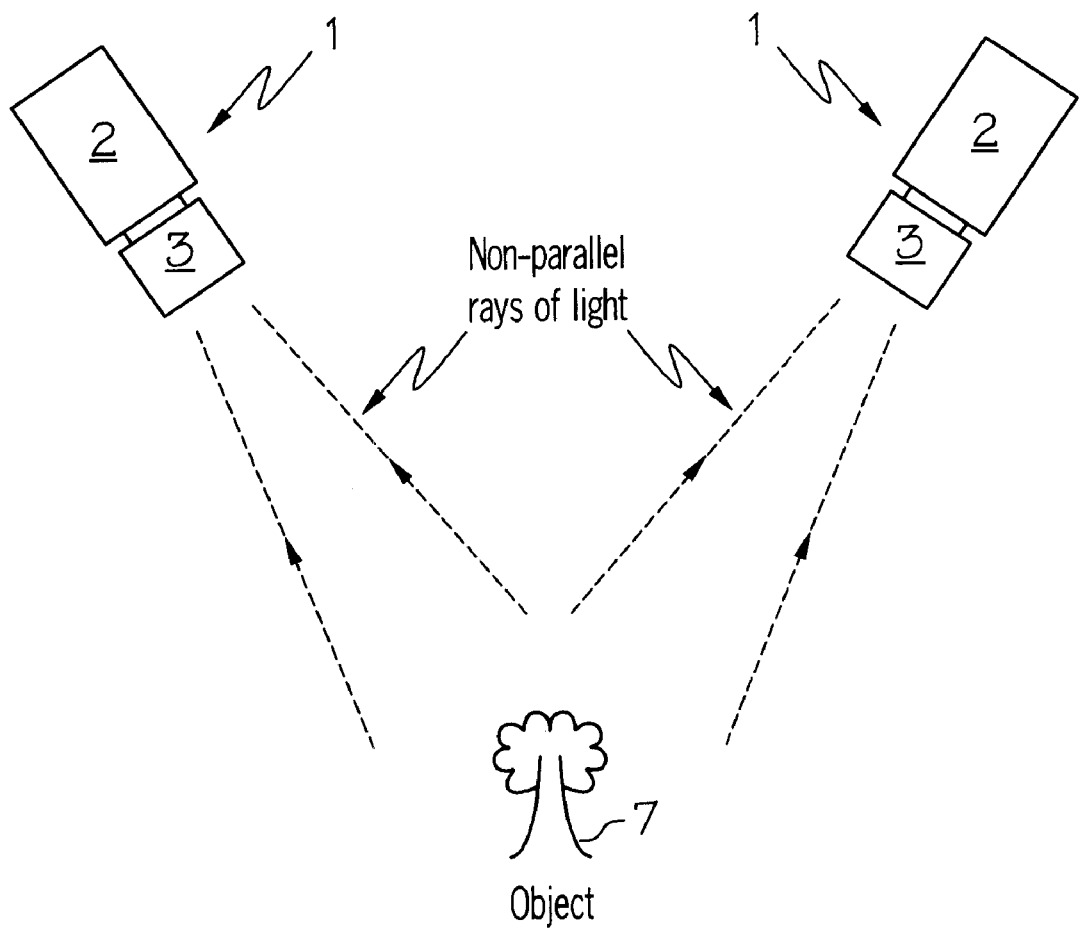
FIG. 1 shows the use of two video cameras and lenses in conventional stereo vision.
Figure 2:
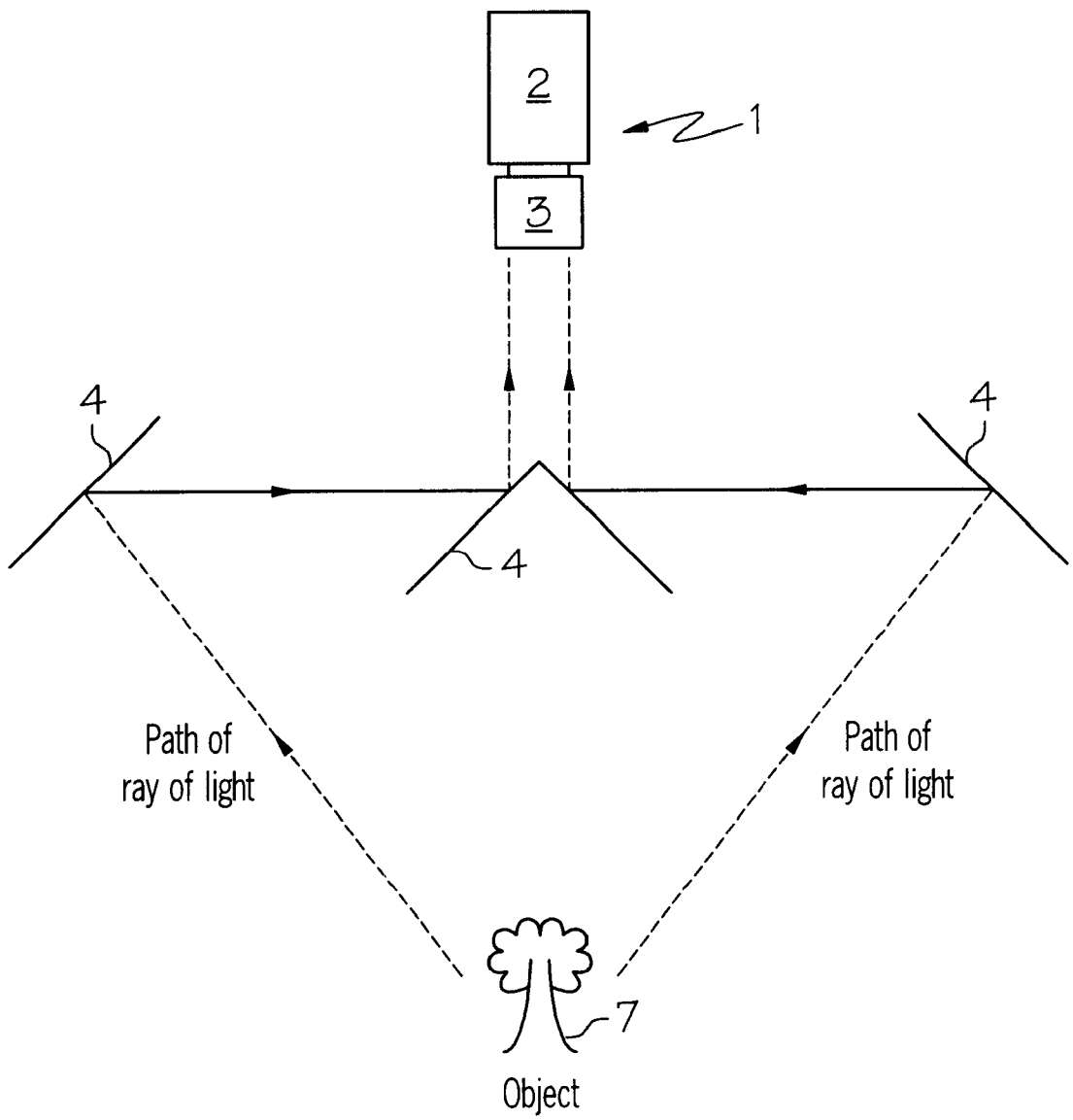
FIG. 2 shows a conventional use of mirrors with one single video camera and lens to obtain stereo vision.
Figure 3:
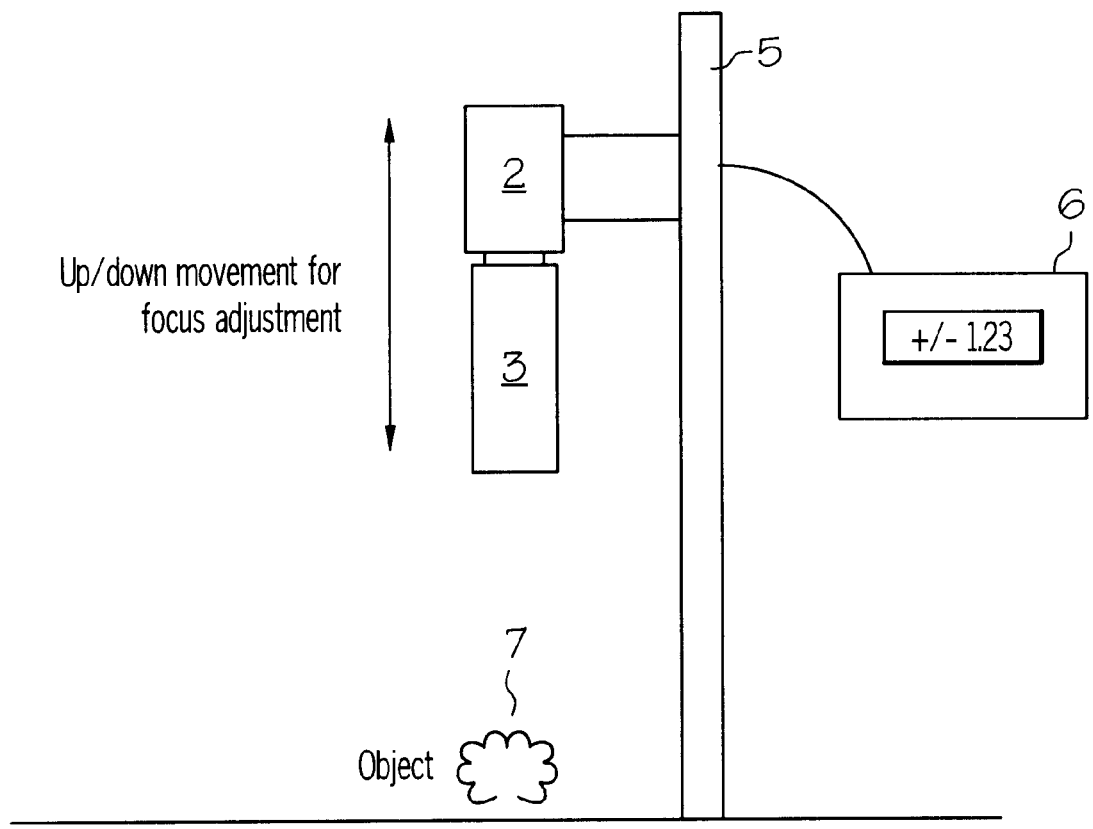
FIG. 3 shows the conventional use of a travelling microscope with UP/DOWN movement for focus adjustment whereby the depth or height is obtained from the distance travelled in the UP-DOWN direction of the travelling microscope.

Consideration should be taken to ensure that the image formation device, for instance an optical lens, has a large depth-of-field. This is in contrast to a prior art, which computes depth from focus as discussed above in conjunction with FIG. 3. Depth from focus requires a very narrow depth-of-field. Careful selection of the focal length and focal distance is also required so as to maintain the region of interest of the object within the field of view of the imaging sensor.

As a further feature, this invention utilises a telecentric lens 9 so as to allow for simplicity in computation and analyses. A telecentric lens unlike a normal lens provides a parallel viewing angle without parallax or perspective distortions as shown in FIG. 4. A standard non-telecentric lens, for instance a 50 mm Macro optical lens, can also be used with the invention with additional computation required during the analyses.

In a different embodiment of the invention, the invention also utilises a telecentric lens of variable magnification, similar to a zoom lens. This allows the object under view to be seen with a variety of magnifications for the purpose of viewing different details of one or more objects. Alternatively, the zoom feature of the telecentric lens provides the convenience of setting up the optimal field of view of the invention.

Stereo Image Beam Splitter/Bi-Image Beam Splitter

In a first preferred embodiment of the present invention there is used a single imaging sensor and image formation device with a stereo image beam splitter to obtain a pair of stereo images. An example of stereo image beam splitter used in this invention is an uncoated right-angle prismatic device 11 as shown in FIG. 4 or FIG. 14.

Figure 5A:
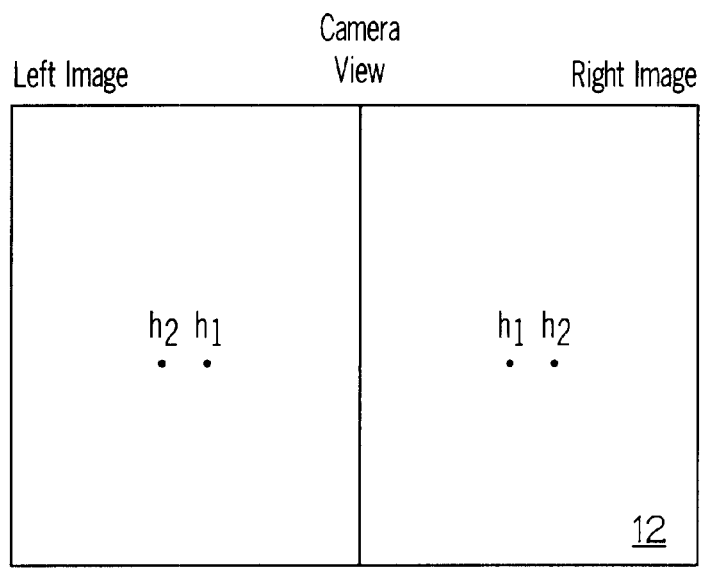
FIG. 5($a$) shows a single camera view composed of a left and right image obtained by the use of the stereo image beam splitter as shown in FIG. 4.
Figure 5B:
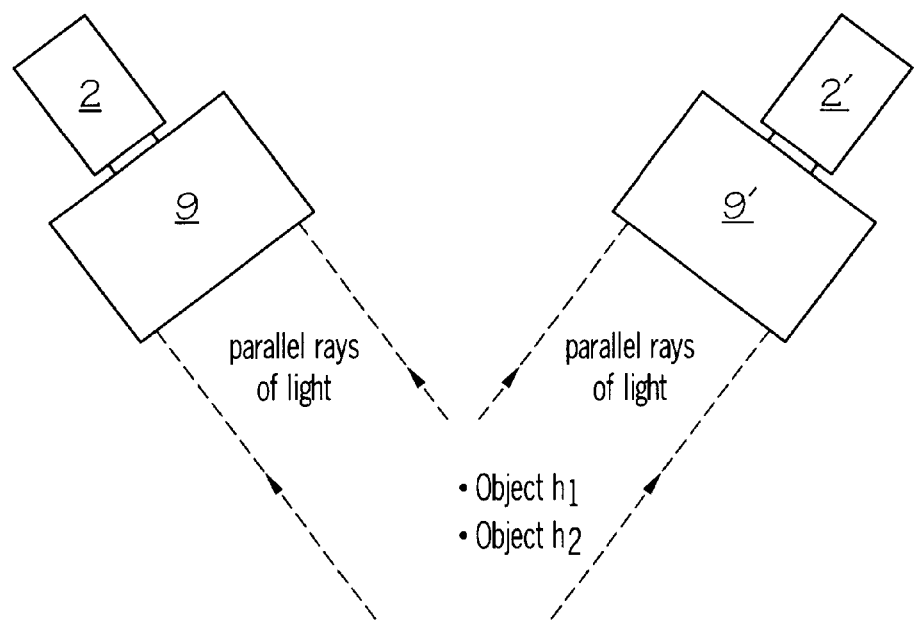

FIG. 5(*a*) shows a single camera view composed of a left and right image from the use of the stereo image beam splitter 11 as shown in FIG. 4.

The prismatic device 11 divides the image of the object or objects into two half-images divided vertically in the center of an imaging area 12. For the purpose of the present invention these images are called the "left" and the "right" images as shown in FIG. 5(*a*).

FIG. 5(*a*) is a simple representation of the rays of light being split by the prism and being formed through the telecentric lens 9 onto the imaging sensor. The resultant left and right image as seen by the imaging sensor are represented in this drawing. For simplicity, the optical elements representing the telecentric lens 9 are not shown and the inversion of the image due to proper optical ray tracing is simplified and not shown.

The left and right images although similar are not identical. The composite image is equivalent to a combined view of two imaging sensors—one displaced to the left and at an angle and the other displaced to the right angled as shown in FIG. 5(*b*). These two images make up the stereoscopic pair.

FIG. 5(*b*) shows the functional equivalence of the apparatus shown in FIG. 4 if two cameras 2, 2' are used—one displaced to the left and at an angle and the other displaced to the right and at an angle. The rays of light are parallel due to the use of two telecentric lenses 9, 9'.

Figure 6:
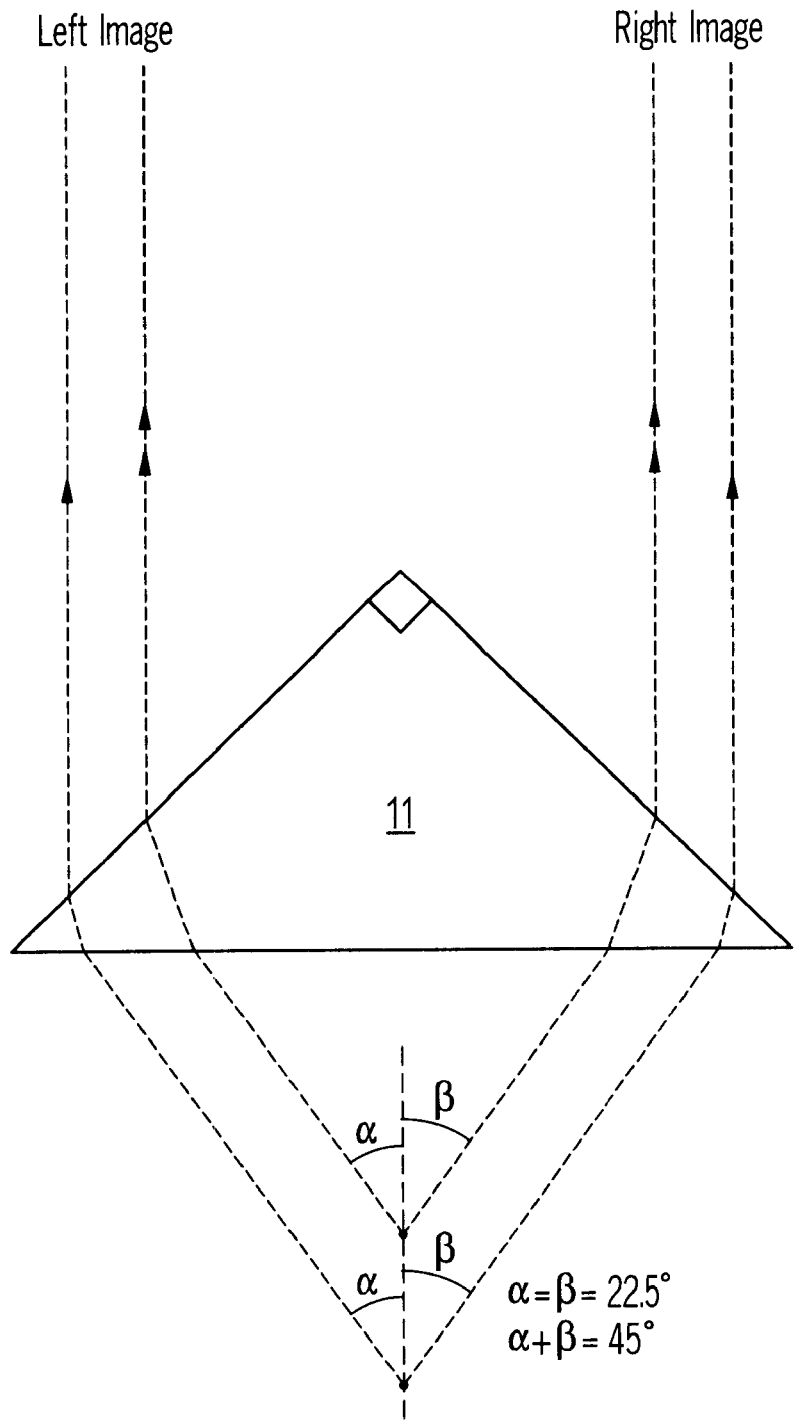
FIG. 6 shows the paths of rays of light travelling through an uncoated right angle prism.

FIG. 6 shows the paths of rays of light travelling through an uncoated right angle prism 11. In this case, the differential angle of the stereo pair of the left and right image is $\alpha+\beta=45$ degrees.

For instance, if the invention uses a right angle prism with an appropriate refractive index, a viewing angle of 22.5 degrees from the vertical can be obtained by both the left and right views. The differential angle between the two stereo pairs would be 45 degrees as shown in FIG. 6.

The choice of the right angle in the prism is one of convenience. Any prism with a narrower or wider apex angle can be used provided that both the left and right images contain the object of interest.

The prism can also be made using a variety of materials and refractive indices, such as glass or plastic. Other examples of prisms that can be used include pairs of Brewster or wedge prisms or Pentagon prisms. The differential angle between the two stereo pairs also need not be strictly 45 degrees, and alternative angles can be used.

Although a right angle prism is readily available and used as a right angle reflector or other purposes, this invention uses the uncoated right angle prism in a novel manner to split a single view of an object into two views.

Light Source

In a preferred embodiment this invention uses an uncoated prism rather than a multitude of mirrors, or their prismatic equivalent.

However, the use of prisms produces a prismatic effect of dispersing white light. When white light is refracted twice through the prism, the white light is dispersed into the various spectra of colours, not unlike the rainbow. This effect although favorable in other applications, distorts the image in the invention. This chromatic aberration blurs the image.

At low magnification of the image, this effect can be ignored, as the image quality is still acceptable for viewing and for low-resolution measurements. However, at high magnification and for high-resolution measurements, these distortions interfere with the measurement accuracy.

To overcome this aberration, this invention uses a light source with a monochromatic light and a narrow spectrum or light with a singular frequency. An example of light with a singular frequency would be an array of red Light Emitting Diodes (LEDs) as the light source. Any colour laser or laser diode can also be used to achieve the same effect. White light can also be filtered with a narrow band filter or the imaging lens can be fitted with such a filter.

If colour imagery is required, the invention separately lights the object with three coloured lights—Red, Green and Blue for instance—to build up the colour image.

Another design consideration in the invention to reduce chromatic aberration is to minimise the size of the prism to reduce the distance the light has to travel within the prism.

The light source can be placed in any position to effect optimal lighting condition. An example of the light source placement is shown in FIG. 4 and FIG. 14. By means of such a placement of a light source 8 the object 7 to be viewed can be homogeneously illuminated.

Analytical Device

The invention makes use of an analytical device 10 to compute the three dimensions of the object as shown in FIG. 4.

In this invention, the analytical device is a computational machine which allows a sequence of instructions to be carried out and means to input and output information. The sequence of instructions is the software of the analytical device. An example of an analytical device is a Personal Computer (PC). The PC used in this invention has means of interfacing with the imaging sensor, other analytical devices, machines and humans.

In this invention, the analytical device is capable of converting the image formed on the image sensor into information or data which can be computed and analysed by the analytical device. For instance, the image can be decomposed into a 1-D or 2-D array of pixels with digital intensity information.

Analytical Device Software

The simplicity of the invention can only be appreciated when one considers the simplicity in 3-D computation and analyses required using this invention.

Conventional stereoscopic imaging systems require the use of complex 3-D computational to compute 3-D information. The methodology for this is described in readily available textbooks.

This invention, through the use of the telecentric lens and the optional use of a right angle prism, reduces the complexity of analyses.

Corresponding Pixel Points and the Corresponding Pixel Distance

The invention makes use of spatial distances between the corresponding pixels in the left and right images to compute the height or distance data.

For sake of simplicity the following considerations are based on a case where a bi-image beam splitter is used as a means for generating two parallel bundles of parallel light rays, each of said parallel bundles of parallel light rays containing image information of the illuminated object to be viewed and said parallel bundles of parallel light rays being separated from each other in an image area in an imaging means.

In this example a stereo image beam splitter splits the images into two images. Accordingly, any image point in one image will also be seen in the other image (provided that the point is not occluded).

Figure 7:
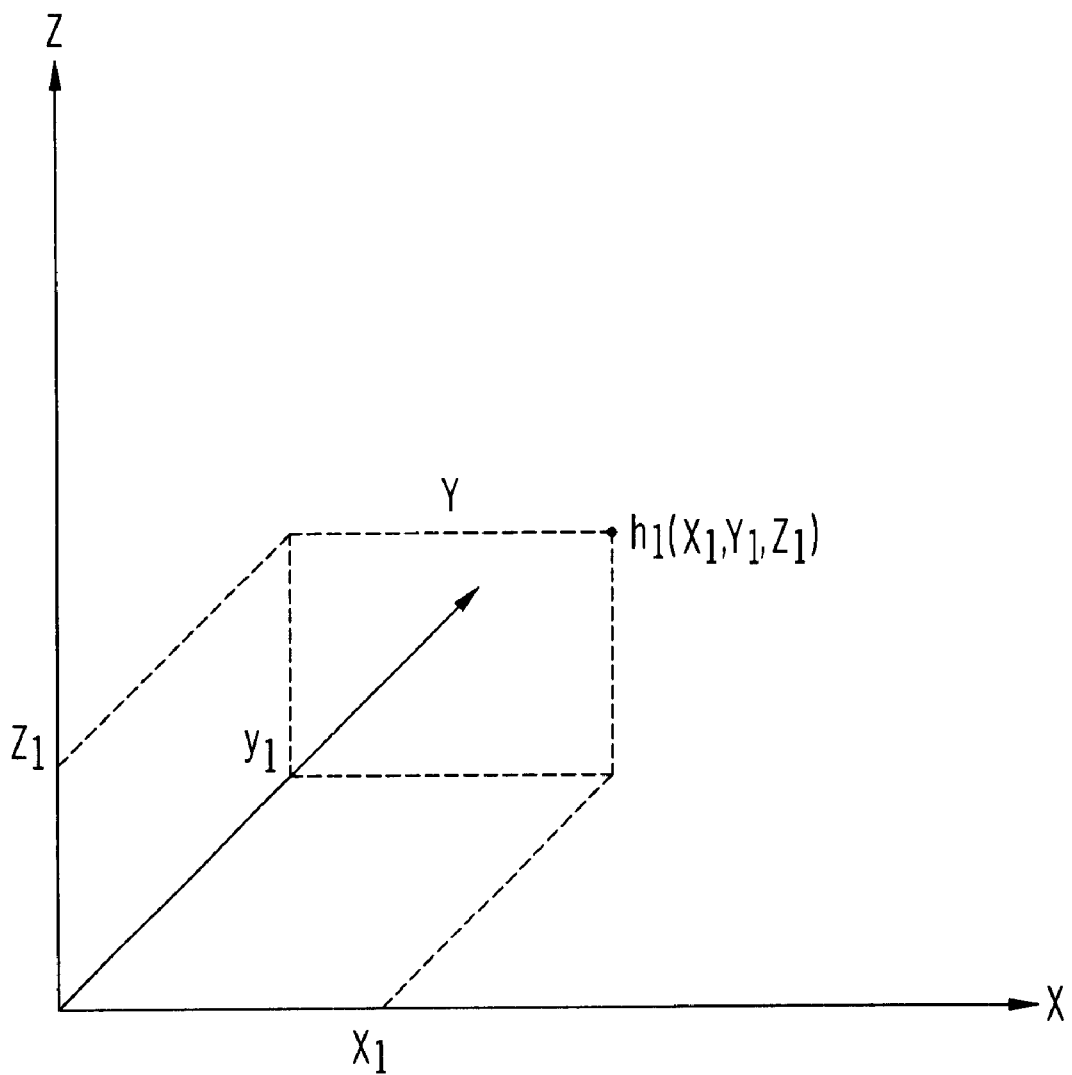
FIG. 7 shows the representation of a 3-D coordinate system of a point in space $b_1$ with the coordinates $(s_1, y_1, z_1)$.

FIG. 7 shows the representation of a 3-D coordinate system of a point in space $h_1$ with the coordinates $(x_1, y_1, z_1)$. A point in space $h_1(x_1, y_1, z_1)$ is located within the field of view of both images, X, Y and Z being the coordinate axes of the point in space relative to an origin.

Figure 8:
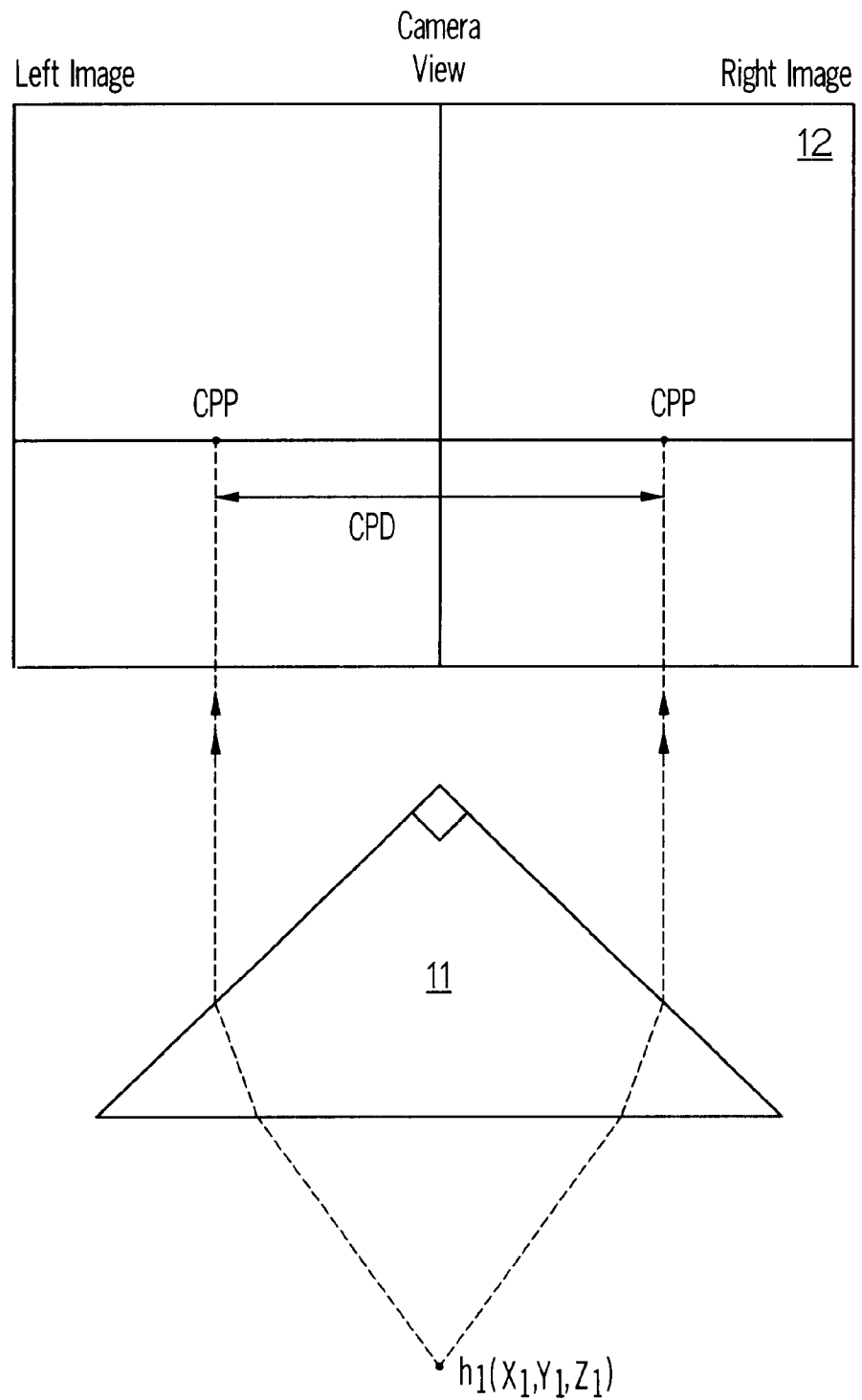
FIG. 8 shows in a diagrammatic representation the two paths travelled by the twin rays of light from the point $b_1(x_1, y_1, z)$ shown in FIG. 7 through the stereo image beam splitter shown in FIG. 4.

FIG. 8 shows in a diagrammatic representation the two paths travelled by he twin rays of light from the point $h_1(x_1, y_1, z_1)$ shown in FIG. 7 through the stereo image beam splitter 11 shown in FIG. 4 which results in a left and a right image of the point $h_1$ as viewed in an imaging area 12 (FIG. 5a) by the camera 2 (FIG. 4). The two corresponding points on the left and right image (FIG. 8) are called the Corresponding Pixel Points or CPP and the horizontal distance between them is called the Corresponding Pixel Distance (CPD).

The point in space as seen by the left and right images as pixel points on the imaging sensor is shown in FIG. 8. Due to the construction of the prismatic device and the vertical alignment of the two faces relative to the sensor, the two points on the left and right images fall along the same horizontal line. That is to say, any point seen in one image can be found in the other image along the same horizontal line. This shall be called the Corresponding Pixel Points or CPP. The respective projected rays of light are shown in dotted lines in FIG. 8.

Figure 9:
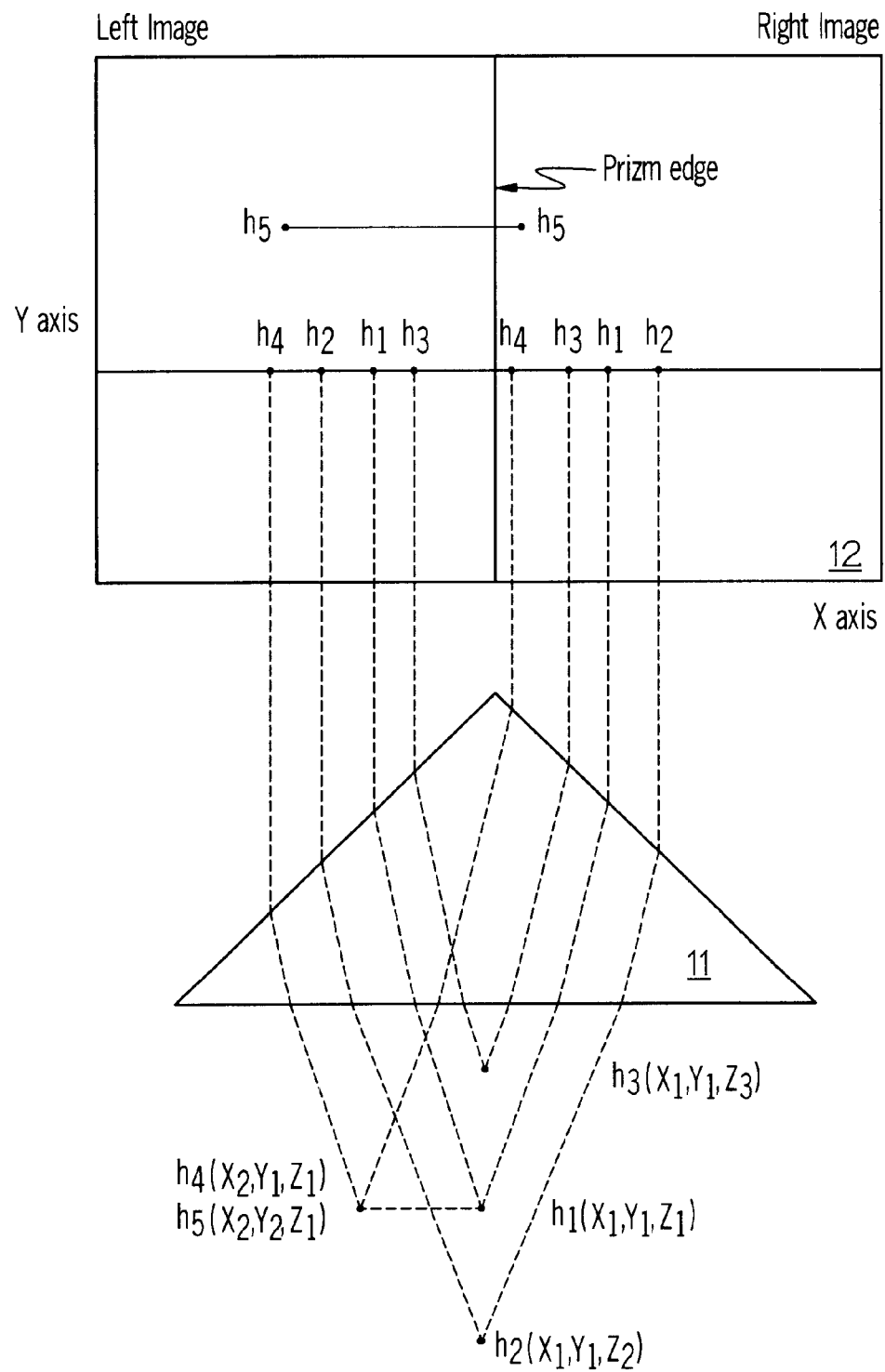
FIG. 9 shows in a diagrammatic representation corresponding to the one shown in FIG. 8 more image points and their respective relationships.

FIG. 9 shows in a diagrammatic representation corresponding to the one shown in FIG. 8 more points and their relationship to CPP and CPD. The farther an object point is away from the beam splitter 11, the larger the CPD. Furthermore, the CPD remains unchanged even if the point is offset along the x and y axes. This will be discussed in more detail further below.

Figure 10:
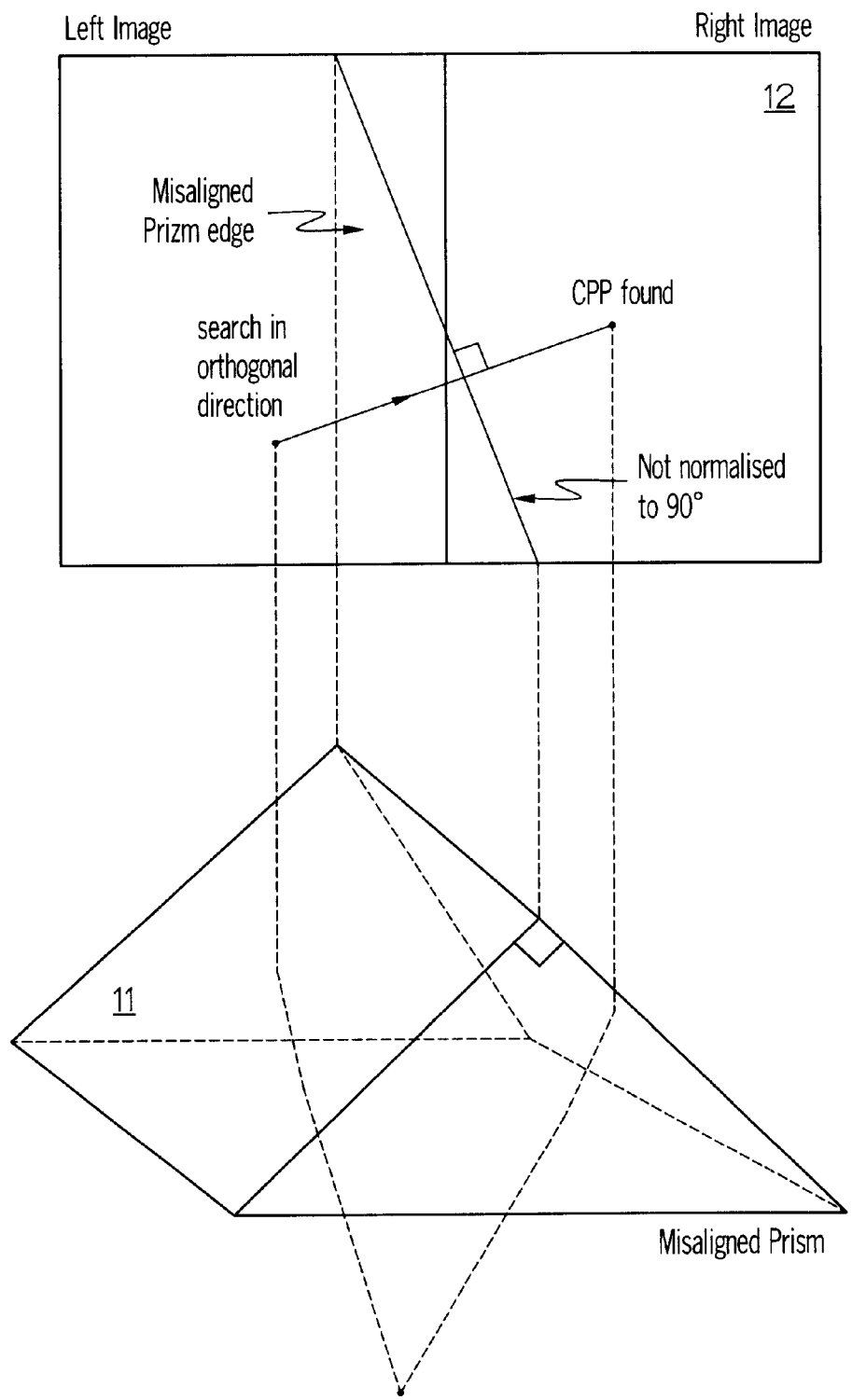
FIG. 10 shows in a diagrammatic representation corresponding to the one shown in FIG. 8 the effect of a misaligned prism and the resulting skew in the left and right images in the apparatus shown in FIG. 4.

FIG. 10 shows in a diagrammatic representation corresponding to the one shown in FIG. 8 the effect of a misaligned prism and the resulting skew in the left and right images in an apparatus according to the invention. The distance between the two corresponding pixel points in the left and right images as seen by the imaging sensor is called the Corresponding Pixel Distance or CPD. However, instead of searching along the horizontal axis, a search along the orthogonal axis will yield the corresponding CPP.

Referring again to FIG. 9, consider another point $h_2$ $(x_1, y_1, z_2)$ at a different height and with a different z-coordinate position. As the point $h_2$ is farther away from the imaging sensor, the respective pixel points will fall along the same horizontal line but at a further distance apart. The CPD is therefore larger. If one considers a nearer point $h_3$ $(x_1, y_1, z_3)$, the CPD is smaller.

Let us consider in FIG. 9 an off-center point in the y-axis, namely $h_4$ $(x_2, y_1, z_1)$. Although the point is displaced to the left, the CPD is identical to the previous point $h_1(x_1, y_1, z_1)$ because they are both at the same height. Similarly, if the points were off center in the y-axis, the CPD would remain the same as shown by the point $h_5$ $(x_2, y_2, z_1)$.

Although the imaging area 12 could in principle be any curved imaging area describable by a set of two coordinate axes in the preferred embodiment of the invention as illustrated and explained by means of FIGS. 4–14 the imaging are is preferably a flat plane so that the relationship between the distance of an object point to the imaging sensor and the Corresponding Pixel Distance between the left and right images of the object point in the imaging plane is strictly linearly proportional. This simplifies the depth computation and analyses significantly to only the CPD calculation and makes it possible to perform 3-D analyses by the using simply commercially available standard personal computers without necessarily having extremely high computational power.

The use of a telecentric lens 9 and the precision prisms simplifies the 3-D calibration process. The use of a telecentric lens 9 also ensures that there are no parallax or perspective distortions and therefore, reduces the need to correct for these distortions.

In the preferred embodiment of the present invention, the search for the Corresponding Pixel Points making up the stereo image can be found by searching along the horizontal axis in the other image. This simplifies the image processing required for searching significantly as well.

Functional Operation of the Analytical Device

The functional operation of the analytical device is defined in two steps, namely a) Calibration, and b) Measurement.

Calibration

Calibration is necessary to compute the pixel to physical dimension relationship instead of calculating the relationship using complex mathematical formulae.

Figure 11:
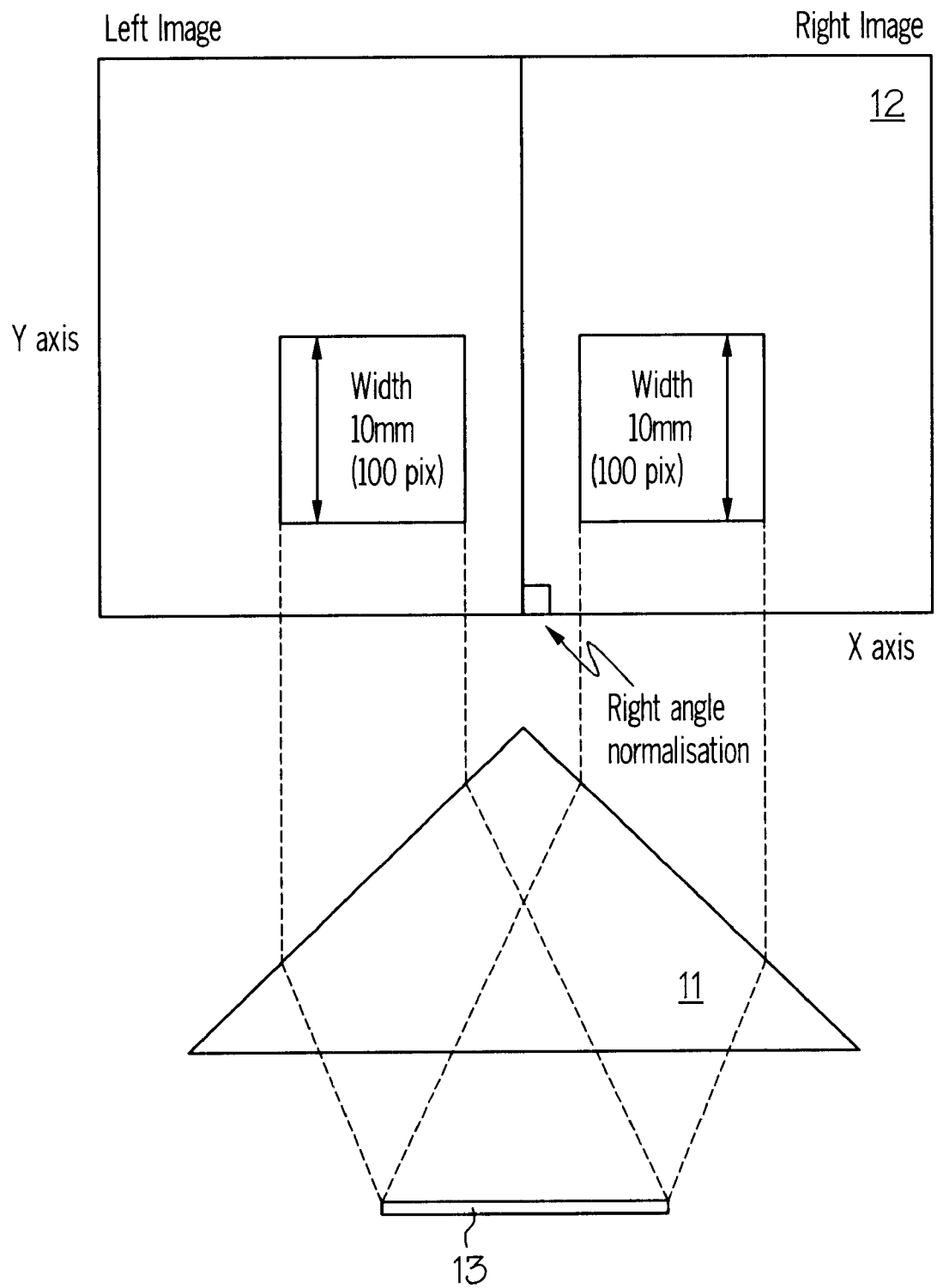
FIG. 11 shows the use of a flat calibration device placed flat in reference to the stereo image beam splitter shown in FIG. 4.

FIG. 11 shows the use of a flat calibration device 13 placed flat in reference to the stereo image beam splitter 11 shown in FIG. 4. The resulting left and right images are shown. The prism edge is also shown to be normalized and at a right angle to the horizontal.

Figure 12:
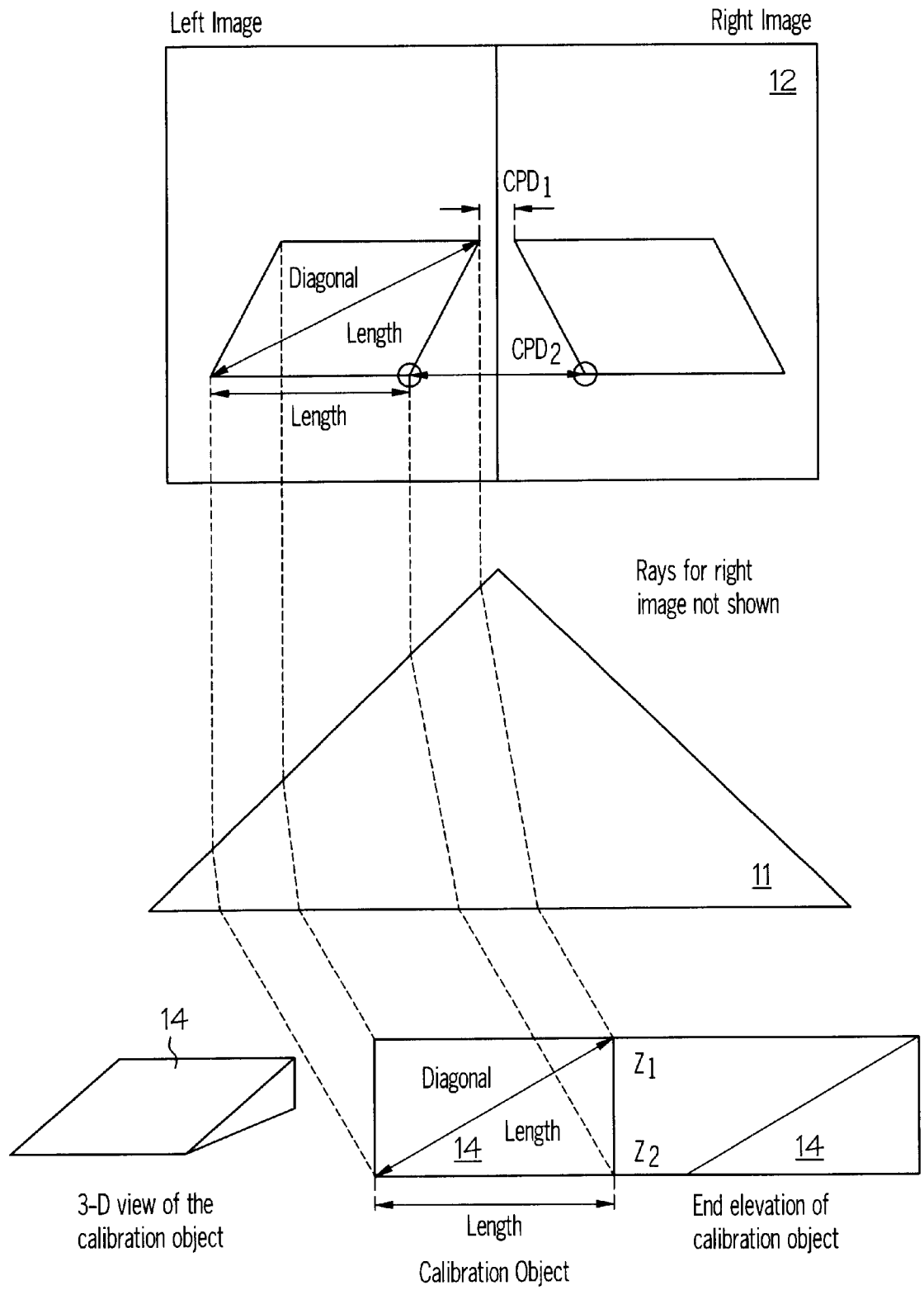
FIG. 12 shows an elevated triangle (wedge) used as a calibration device for the z- and y-axes in reference to the stereo image beam splitter shown in FIG. 4.

FIG. 12 shows an elevated triangle (wedge shape) 14 used as a calibration device for the z and y-axes in reference to the stereo image beam splitter 11 shown in FIG. 4. The known diagonal distance between two points $z_1$, $z_2$ is used to calculate the real y-axis calibration factor once the z-axis calibration factor is found.

Figure 13:
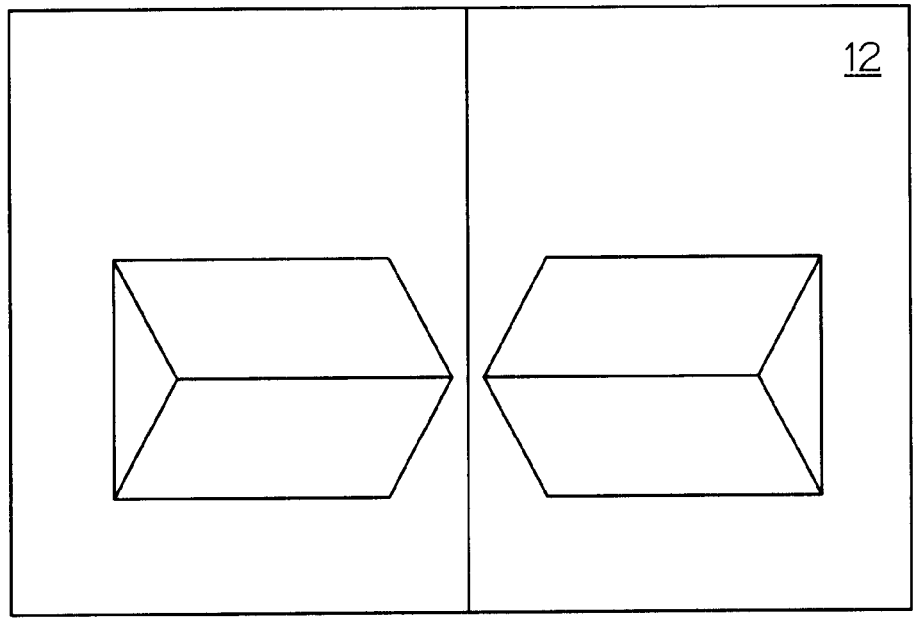
FIG. 13 shows the use of a composite calibration object for use in calibrating all three dimensions.
Figure 13:
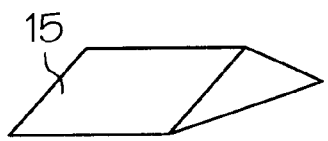
Figure 13:
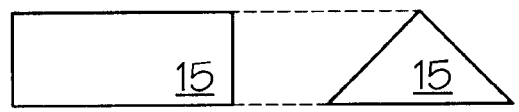

FIG. 13 shows the use of a composite calibration object (double wedge shape) 15 for use to calibrate all three dimensions.

To calibrate the invention in three dimensions, a 3-D object with known length (x-axis), width (y-axis) and height (z-axis) dimensions is placed in the field of view as set up before the telecentric lens. To calibrate each axis successfully, each axis must have a pair of points of known dimensions along that axis.

With the invention, calibration can be performed using any prominent feature that can be seen by both left and right images. For instance, corner points, fiducial points, edges, centers of features, blocks of textures, patterns, features enhanced by projected light or structured light and so on can be used as landmarks (reference points) for performing the calibration.

Y-Axis Calibration

To calibrate the y-axis, an object with a known width is used. An example of such a calibration device is a flat rectangular device 12 of parallel opposite sides as shown in FIG. 11. For the purposes of calibration, the calibration device is placed and aligned vertically and horizontally to the imaging system. The calibration device should also be flat and the dividing edge of the two faces at he apex of the prism is preferably vertically aligned to the imaging sensor.

Then one starts with the left image. If the width (y-axis) of a rectangle $(x_1, y_1, z_1)$ and $(x_1, y_2, z_2)$ is 10 mm and the number of pixels used to represent this length by the analytical device is 100 pixels, then the vertical resolution of each pixel is equivalent to 0.1 mm. Using standard image processing sub-pixel methodology, fractions of a pixel can also be represented.

This process can be repeated with the right image to check a number of things, namely to check:

the calibration process:

the alignment of the assembly relative to the placement of the calibration device, and the proper construction of the prismatic device.

If the prism is properly constructed and the alignment is accurate, the calibrated readings from both images should be the same.

The use of the telecentric lens in this invention means that the pixel resolution of the y axis, of both left and right images, remains constant throughout the field of view and is space invariant, i.e. not dependant of the spatial coordinates.

Z-Axis Calibration

Similarly, to calibrate the z-axis, an object with a known height is used for calibration. For example as shown in FIG. 12, a rectangular wedge-shaped device 14 with an elevated side is used. The calibration device is aligned as before, then the CPP is determined and the CPD of two points is computed at the two different heights as shown. Then the height resolution relationship to the CPD is computed. For instance, if the height (z-axis) of the rectangle $(x_1, y_1, z_1)$ and $(x_1, y_1, z_2)$ is 15 mm and the number of CPD in pixels used to represent this length by the analytical device is 100 pixels, the height resolution of each pixel is equivalent to 0.15 mm.

Again, sub-pixel resolution can be used for high-resolution representation.

X-Axis Calibration

The x-axis calibration can be performed in a similar fashion to the calibration of y and z-axes.

However, due to the difficulty in aligning and ensuring that the calibration device is flat in relation to the imaging sensor, an alternative method using the absolute distance can be used:

Two diagonal points representing the length of the object are chosen as before. Since the points are at different heights, the absolute distance formula between the two points is used, i.e. $z^2=x^2+y^2$ (Pythagoras's theorem), where x, y and z are the respective distances between the two points.

Combined X, Y and Z Axes Calibration Device

It is possible to combine the calibration of all three axes using a single calibration device. For instance, this invention uses a single double wedge shaped calibration device 15 as shown in FIG. 13 to perform the calibration of the three axes.

Measurement

Once the invention is calibrated, the 2-D data can be obtained from either the left or right images, whichever is more convenient and with less possibility of occlusion. The measured distance in pixels in converted to a physical dimension using the calibration factor. Using the earlier y calibration factor of 0.1 mm per pixel as an example—if the measurement is 80.2 pixels, this translates to a physical dimension of 8.02 mm.

However, the determination of the 3-D height data requires both left and right images. The height is obtained from the calibrated CPD, i.e. of pairs of CPP of any feature point on the object.

If the CPD difference between two points is 42.5 pixels, using the earlier z calibration factor of 0.15 mm per pixel, the height distance between these two points would be 6.375 mm.

Software Process and Methodology

Figure 25:
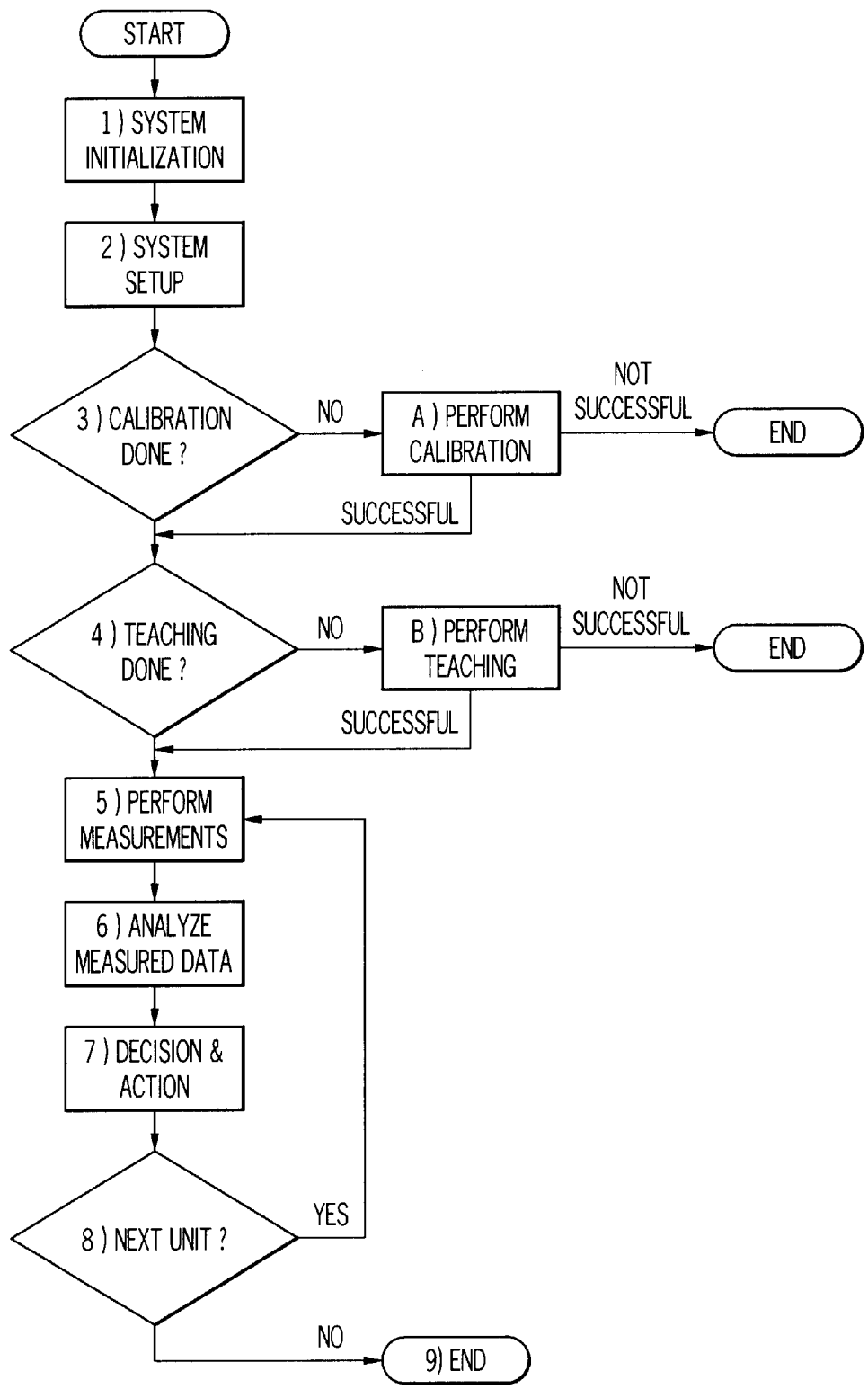
FIG. 25 shows the flowchart of the software process and methodology.
Figure 26A:
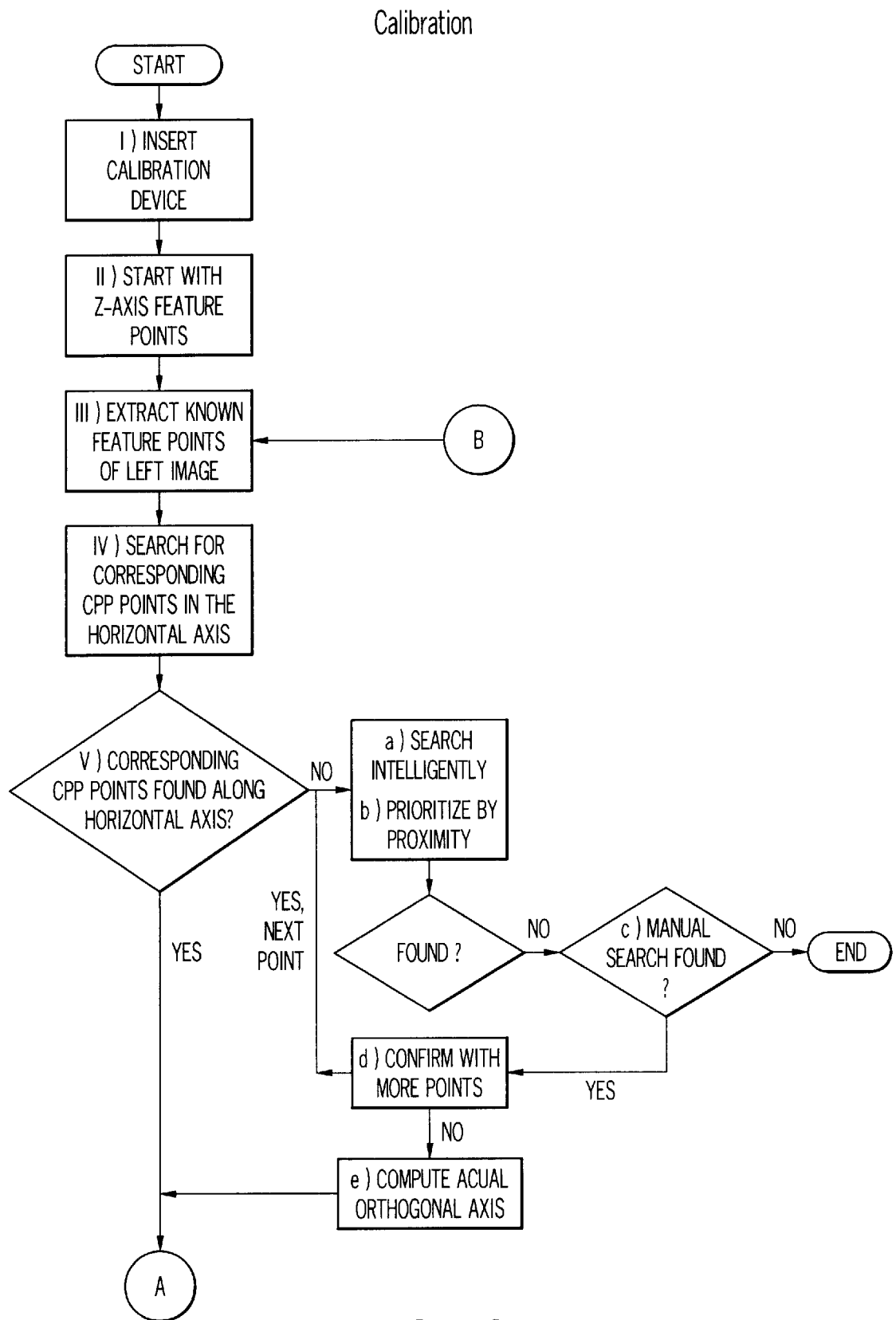
FIGS. 26($a$) and ($b$) show the flowchart of the calibration sub-process.
Figure 26B:
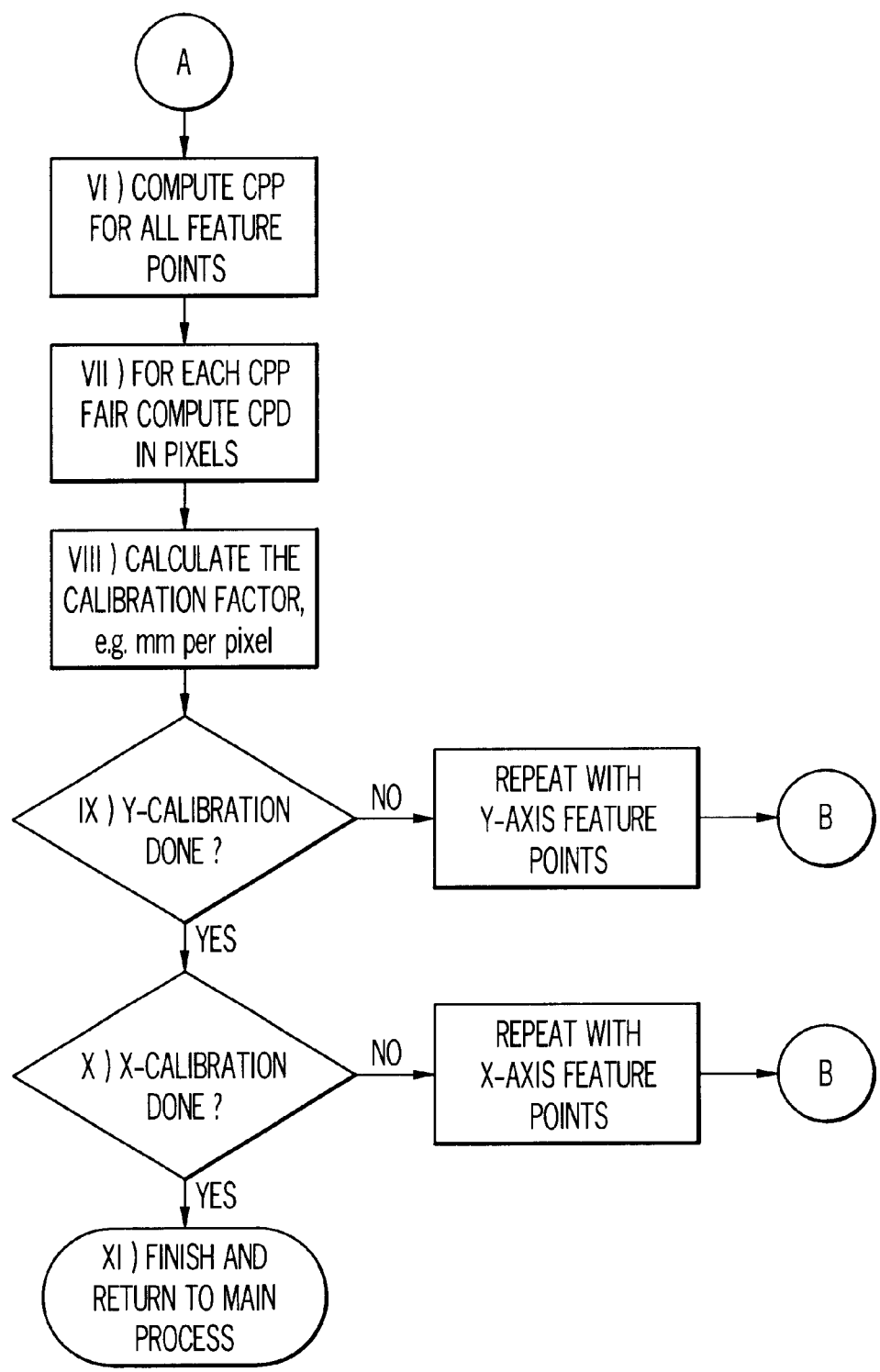
Figure 27:
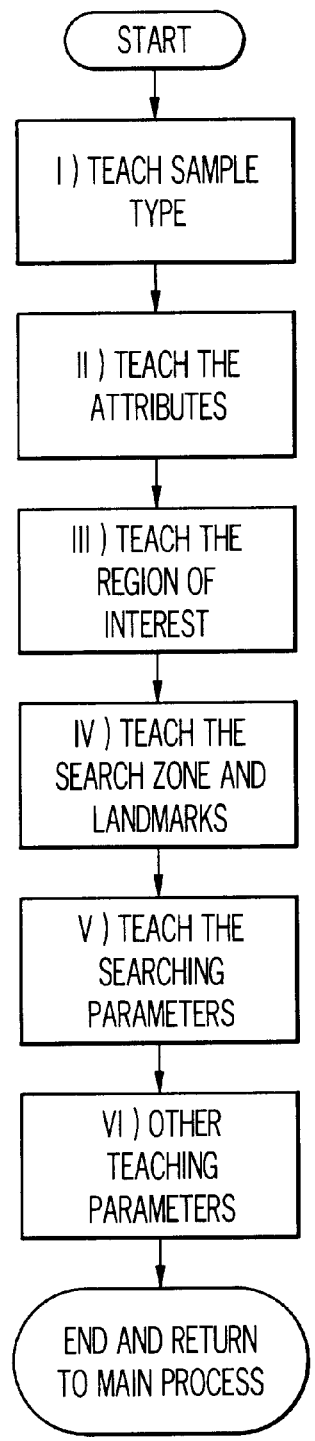
FIG. 27 shows the flowchart of the teaching sub-process.

FIGS. 25–27 show flowcharts visualizing the inventive method for taking 3-D data of an object to be viewed.

The steps of them main process numbered sequentially as shown in FIG. 25 are:

Main Process

1) System Initialisation

Boot up analytical machine;

Initialise all variables and parameters;

Other system initialisation functions.

2) System Setup

Set up image sensor and image acquisition device;

Set up brightness and contrast values;

Set up proper focusing and depth of field;

Setup peripheral devices, for instance printers and so on;

Other setup functions

3) Calibration

Is calibration previously performed and unchanged?

If the answer is YES, proceed to step 4), otherwise;

If the answer is NO proceed to step A) Calibration sub-process before proceeding to the next step.

4) Teaching

Is teaching previously performed and unchanged?

If the answer is YES, proceed to step 5), otherwise;

If the answer is NO, proceed to step B) Teaching sub-process before processing to the next step.

5) Perform Measurements on Current Unit

Use the teaching information to extract the points of interest in the image;

Extract the first set of CPP from the left image in 2-D coordinates;

For each CPP, search for corresponding CPP in 2-D coordinates along orthogonal direction to prism axis in the right image in 2-D;

Correlate the pairs of CPP between the left and right images;

For each pairs of CPP, compute the CPD in pixels;

For each CPD pixel measurement, transform the CPD into a physical height measurement (e.g. in millimeters or thousands of an inch);

Consolidate the physical measurements of all three axis of all points of interests in the image;

6) Analyse Measured Data

Compute and analyse the relationship between points of interest in the image; for instance, to track the profile along one or more lines or edges;

Compute and analyse the physical dimension between points of interest in the image; for instance, the height dimension of the profile along a line.

7) Decision and Action

From the analysed and measured data, make a decision and perform an action;

For instance, either accept the inspected unit, which is within the acceptable 3-D measurement tolerance, and send it to the PASS bin;

or

Reject the inspected object, which is outside the acceptable 3-D measurement tolerance, and send it to the FAIL bin;

Another example is to sort objects of various heights into their respective bins.

In other words:

The values determined for the dimensions of the object to be viewed are compared with a set of predetermined dimension values of a reference object and based on the result of the comparisons at least one attribute value (e.g. "PASS", "FAIL"; "SIZE CATEGORY 1", SIZE CATEGORY 2"; etc.) out of a set of predetermined attribute values is assigned to the object to be viewed and then said object to be viewed is further manipulated based on the at least one attribute value previously assigned to said object (e.g. an object attributed with the attribute value "FAIL" is sent to the FAIL bin).

8) Next Unit

If the NEXT unit is available, go to step 5), otherwise

If NO unit is available, proceed to step 9),

9) End of Inspection

Take the necessary steps to terminate and end the process properly and to shutdown the system if necessary;

The steps of the calibration process numbered sequentially as shown in FIGS. 26(a) and 26(b) are:

Calibration Sub-Process i) Insert the calibration device into the field of view of the system;

ii) Start with the Z-axis feature points;

iii) Extract the known feature points of interests of the calibration device, starting by computing the first set of CPP from the left image in 2-D coordinates;

iv) For each CPP, search for the corresponding CPP in 2-D coordinates along the horizontal direction;

v) If the corresponding CPP is not found to be along the horizontal direction: data of an object (7) to be viewed, comprising:
   a) search intelligently and automatically the whole right image for the corresponding CPP
      Examples of intelligent searching are:
   b) to prioritise the search in the close proximity of the expected location of the corresponding CPP
   c) a manual search by a human operator if automatic searching is not successful
   d) confirm with more points if necessary for higher accuracy, reliability and repeatability;
   e) compute actual orthogonal axis and direction;

vi) For the rest of the CPP, search for corresponding CPP in 2-D coordinates along the actual orthogonal direction;

vii) For each pairs of CP, computer the CPD in pixels;

viii) For each CPD pixel measurement, calculate the calibration factor from the CPD in physical height measurement per pixel (e.g. in millimeters or thousands of an inch).

ix) Similarly, calculate the calibration factor for the Y-axis;

x) Similarly, calculate the calibration factor for the X-axis;

xi) End of sub-process and return to the main process.

The steps of the teaching process numbered sequentially as shown in FIG. 27 are:

Teaching Sub-Process i) Teach the sample type
   Using a user interface (such as for example a keyboard or a mouse) the analytical device (such as a PC) is taught the type of sample to be inspected; for instance, a semiconductor device type with a name SOT23 that is associated with having two wire profiles.

ii) Teach the attributes of the device to be inspected
   For instance the colour or gray level histogram of the wires on the SOT23 device are taught to the PC.

iii) Teach the regions of interests
   For instance, the two wire SOT23 device having two regions of interests, with each region of interests encompassing each of the wire, e.g. the start and end points of the wire profiles in the left and right image respectively.

iv) Teach the search zones and landmarks
   As the original region of interest location may not be accurate and searching in the larger search zones may have to be performed to locate each of the wires;
   Alternatively, these search zones can be referenced relative to a landmark; a landmark is a distinguishing feature or point in the image which can be easily located;

v) Teach or define the range of searching parameters
The optimal type of search methodology and optimised parameters for searching;

vi) Other teaching parameters as necessary.

With the invention, the extract functional sequence of operation need not be followed if the permutation of the sequence still achieves the final outcome. For instance, the steps of calibration and teaching are interchangeable in sequence. That is, teaching can be performed before calibration. Also there is no significance in performing the calculation on the left image before the right image.

In another example, the sequence of finding the complete list of CPPs of the left image before finding the list of CPPs of the right image need not be strictly followed. For instance each pair of CPPs can be found from the left and the right image, followed by the next pair and so on. Another example is that the sequence of calibration of each axis can be interchanged.

Furthermore, if a step has been completed and unchanged, the information related to the step can be saved and recalled later for reuse. Such steps may include setup, calibration and teaching for example.

This invention inherently allows the use of parallel computing architecture as the analytical device. A parallel analytical device would be able to compute the entire left and right images CPPs and CPDs in parallel instead of sequentially. Parallelism can also be extended to include numerous other features of the analytical device of the invention, for instance feature extraction, matching, searching, correlating, computing and calculating.

In a parallel system, the flowchart need not be sequential and can be performed in parallel.

The exact dimensions of each component of the invention are not significant provided that the functional objectives of the component and the invention are met. Similarly, the placement of the components or the location of the features of each component is not essential provided that the functional objectives of the component and the invention are met.

Height Profiling

As described in earlier sections, the search for the CPP along the horizontal axis or the orthogonal axis makes the search for corresponding stereo points very simple. For instance, if the objective is to track a wire height in the vertical orientation, matching the feature points along corresponding CPPs will allow the height profile to be found.

Figure 20:
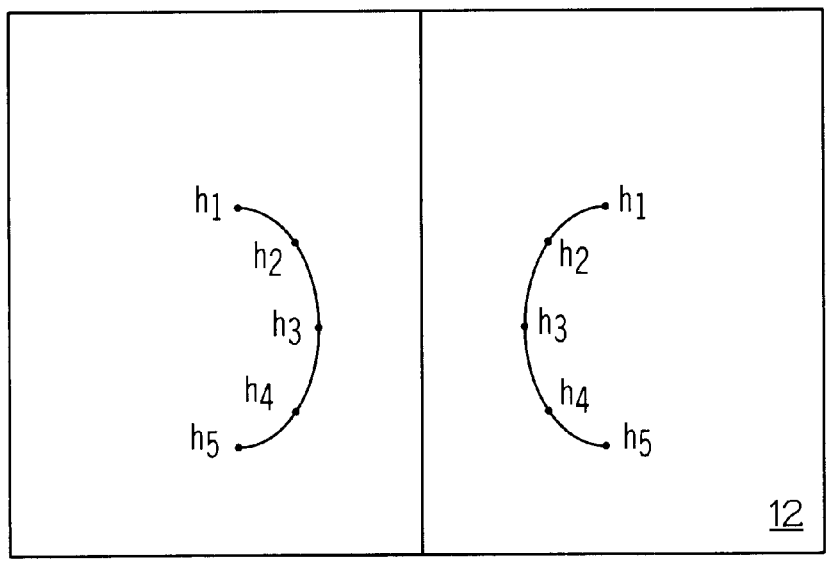
FIG. 20 shows the height profiling of a wire as performed by the use of an apparatus according to the invention.
Figure 20:
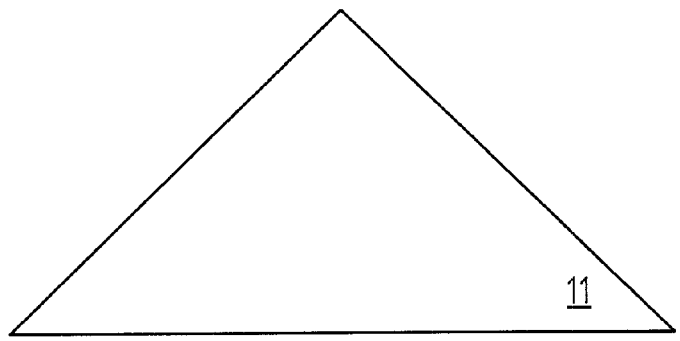
Figure 20:
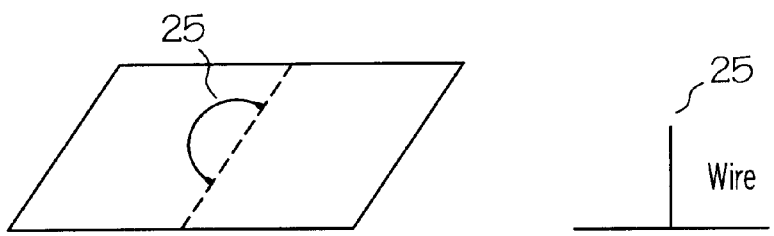

FIG. 20 shows the height profiling of a wire as performed by the use of an apparatus according to the invention; this is shown in FIG. 20 with the use of five CPP points. The invention allows the use of multiple CPP points, limited only by the resolution of the imaging device and by the number of feature points extractable from the image.

For a more complex object, the points and edges of the objects are thus similarly profiled to map the complete feature points of the object.

Figure 21:
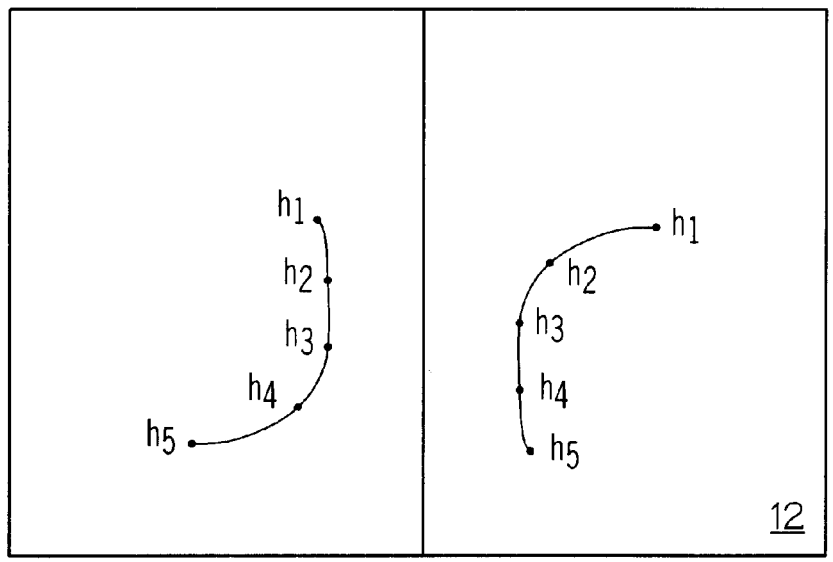
FIG. 21 shows the height profiling of a skewed wire that is not horizontally orientated in a representation corresponding to FIG. 20.
Figure 21:
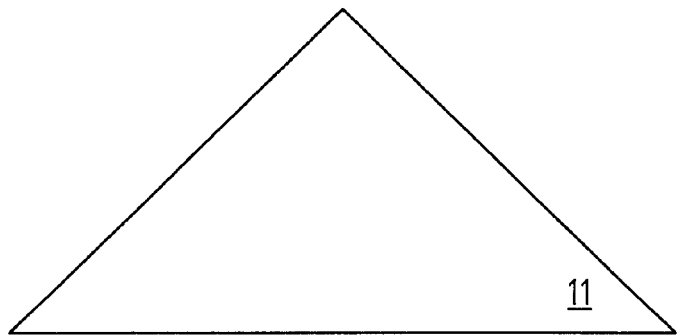
Figure 21:
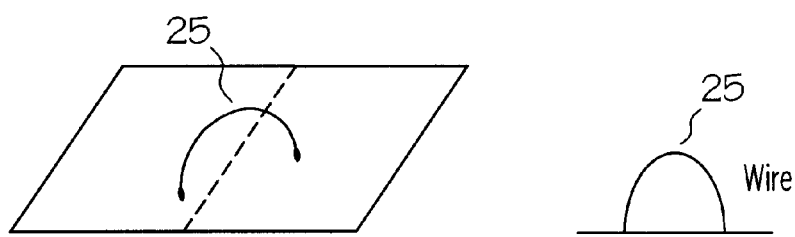

Take another example where the wire is not perfectly horizontally oriented as shown in FIG. 21 which shows the height profiling of a skewed wire that is not horizontally orientated in a representation corresponding to FIG. 21 Even if the wire is skewed, locating the CPPs can still perform the profiling.

Figure 22:
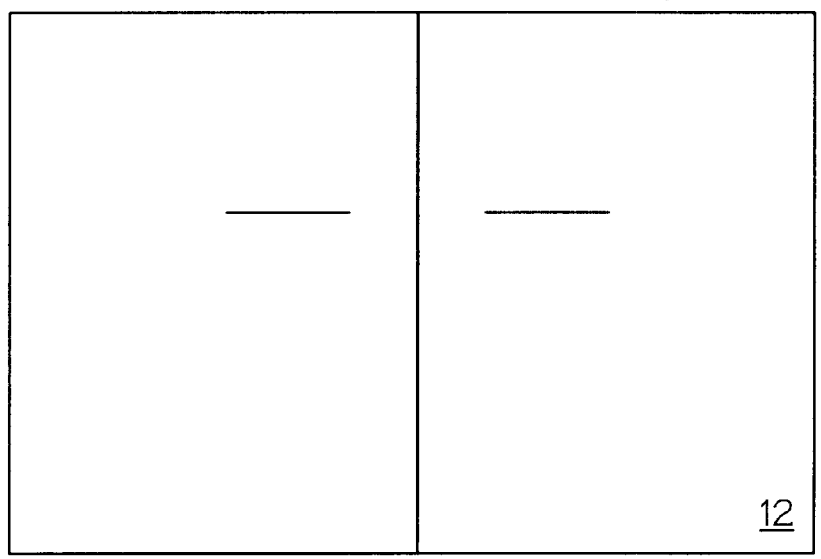
FIG. 22 shows the limitation of height profiling of a horizontally orientated wire in a representation corresponding to FIG. 20.
Figure 22:
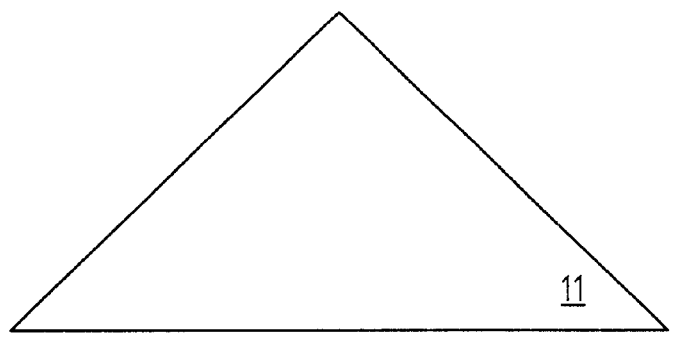
Figure 22:
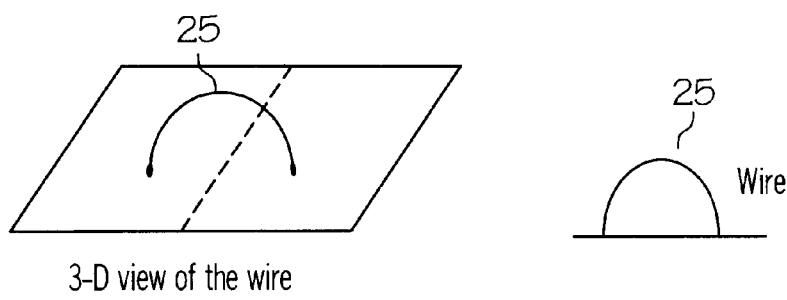

FIG. 22 shows the limitation of height profiling of a horizontally oriented wire. If the wire is oriented exactly in the horizontal axis as shown in FIG. 22, then only the end points can be determined. However, the invention allows for the complete 3-D-measurement device to be rotated by 90 degrees or in any another suitable orientation to enable the profiling. The invention also allows just the prismatic component of the assembly to be rotated.

The invention allows the benefit for the CPP points to be extracted simultaneously from one image for height profiling. Except in case where the object is horizontally orientated, an additional view is required after suitable re-orientation.

In this invention, there is no need to shift the focus, either mechanically or electrically. In this invention, there is also no need to move the object relative to the imaging device and to take another view of the object to determine height or distance.

Lead Height Measurements

The invention can also be used to measure the height profiles of the leads of semiconductor devices.

Figure 28A:
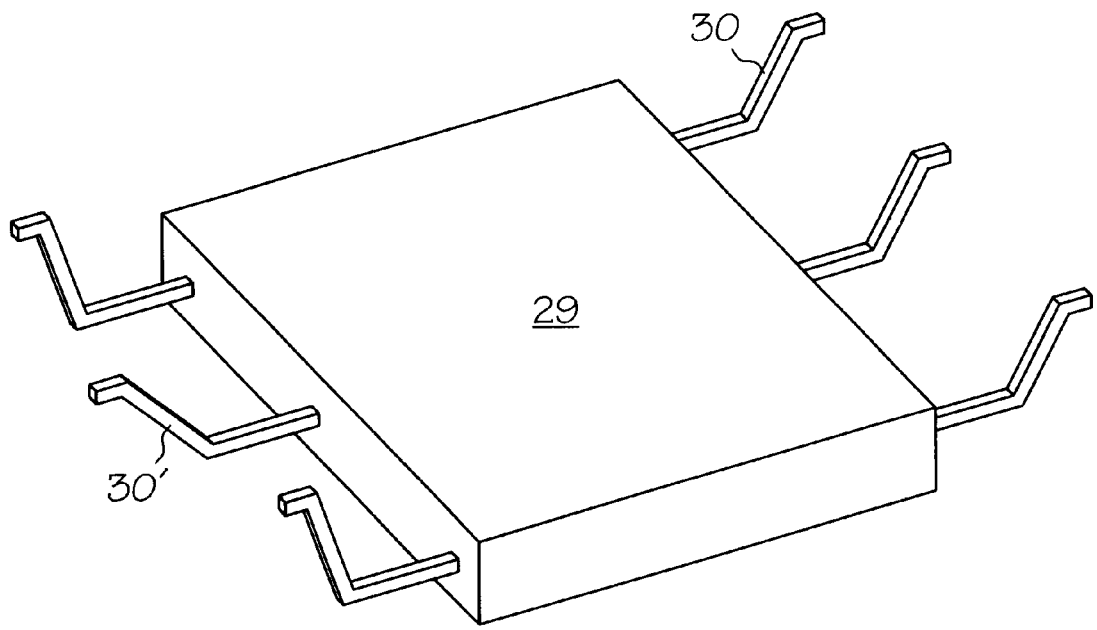
FIG. 28($a$) shows the 3-D view of an inverted semiconductor device.
Figure 28B:
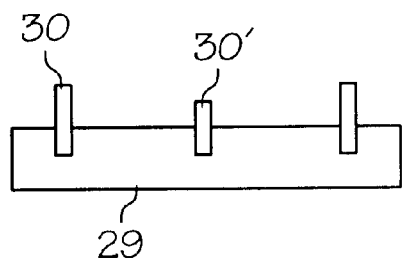

FIG. 28($a$) shows the 3-D view of an inverted semiconductor device and FIG. 28 (b) shows the side view of the inverted semiconductor device 29 and highlights the height variation in the leads 30.

Figure 29:
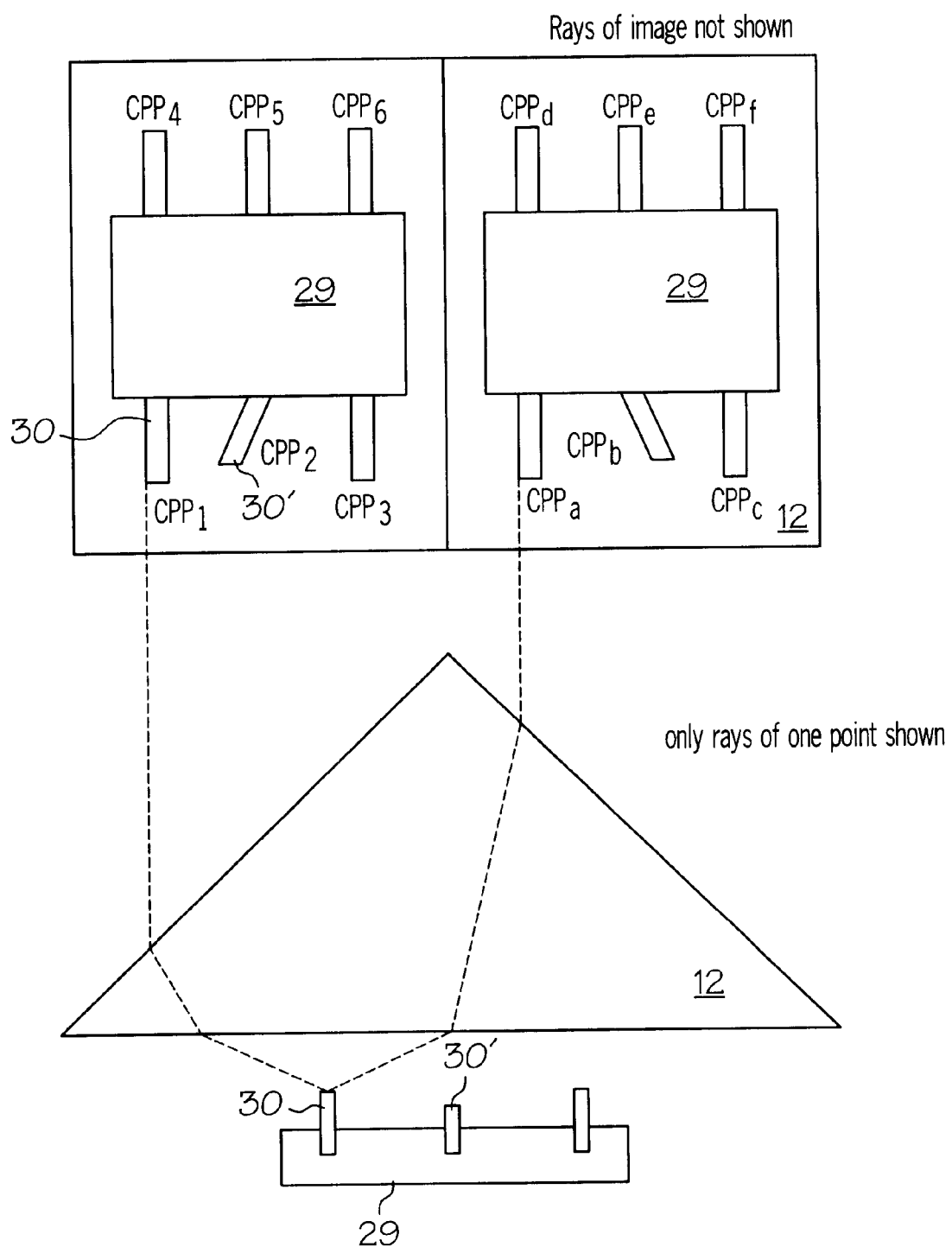
FIG. 29 shows the height profiling of the leaded semiconductor device shown in FIGS. 28($a$) and 28($b$)

FIG. 29 shows the bright profiling of the leaded semiconductor device in an apparatus to the invention.

FIG. 28($a$) shows (a) the 3-D view of an inverted 6-lead semiconductor device such as a SOIC package, and FIG. 28($b$) the side view of the device. The invention can be used to measure the distance of each of the 6 leads away from a reference plane.

As shown in FIG. 28, the leads 30, 30' differ in their distance from a reference plane (such as for example the bottom plate of the inverted semiconductor device).

As shown in FIG. 29 the center of each lead tip can be found by finding the tip of each lead and taking the center of the left and right edges of the tip. Compute the six lead tip centers from the left image. These six points are the CPP of the left image, namely CPP1, CPP2, and so on. Similarly, compute the corresponding six lead tip centers from the right image, namely CPPa, CPPb and so on. If the prism is properly aligned, the corresponding points can be found along the horizontal axis, otherwise search along the orthogonal axis.

Calculate the CPD of each CPP points, that is CPP1 and CPPa, CPP2 and CPPb, and so on, will result in six 3-D height measurements as required. In the example as shown in FIG. 29 the middle lead is further away from the camera system. Therefore, the CPD would be larger as compared to the CPDs of the other leads.

The height measurement can be referenced to the camera or alternatively the reference can be transformed to the seating plane of the semiconductor device.

Figure 15:
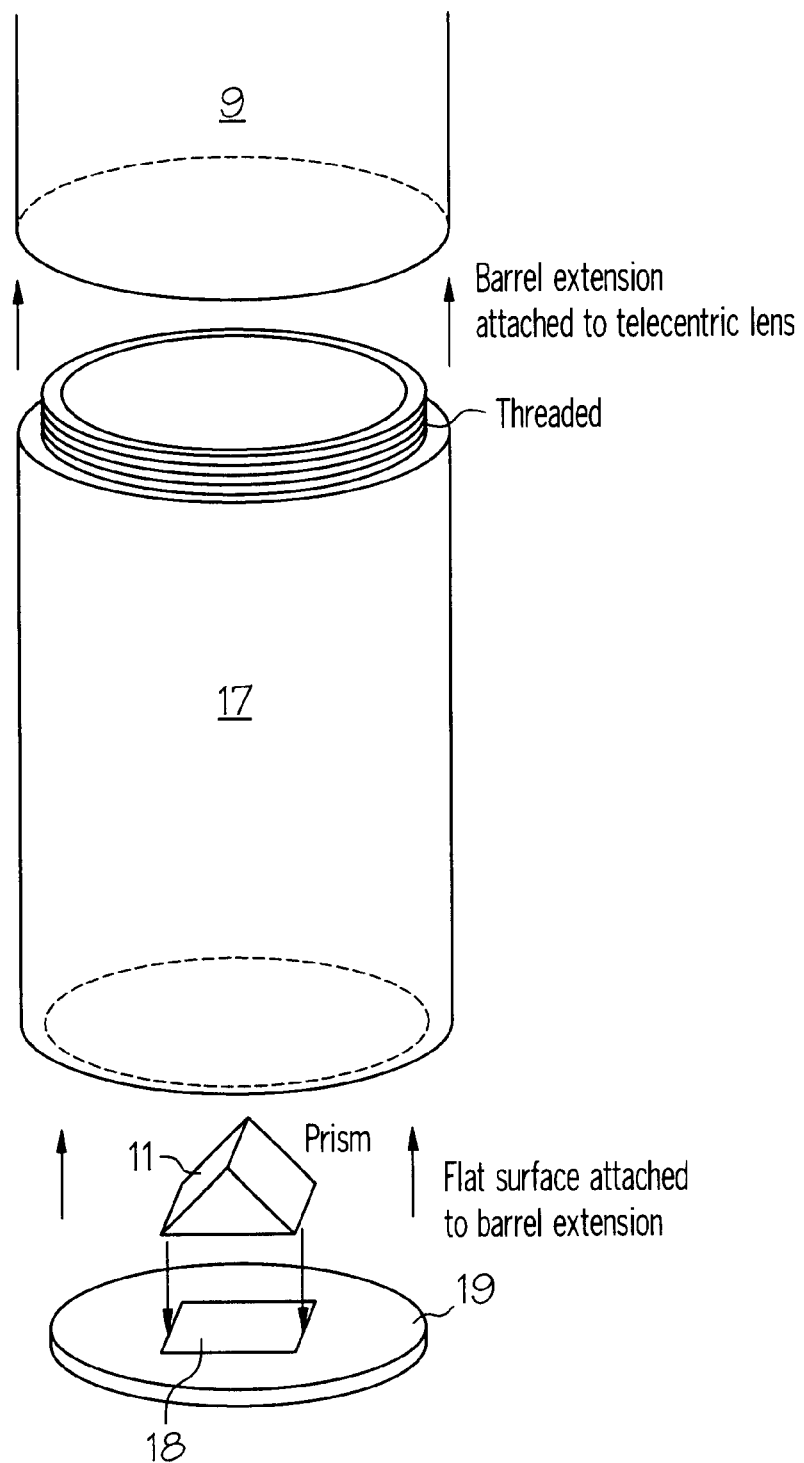
FIG. 15 shows the mounting features of an apparatus as shown in FIG. 14 wherein a barrel extension is used to provide convenience in alignment of the prism relative to the telecentric lens and the camera.

In another preferred embodiment of the present invention which is shown in FIG. 15 there is provided a mounting feature wherein a barrel extension 17 is used to provide convenience in alignment of the prism 11 relative to the telecentric lens 9 and the camera 2. In FIG. 15 the telecentric lens 9 is connected to the threaded barrel extension 17. The other end of the barrel extension 17 has a flat surface 19 with a hole 18 for the prism. The flat surface 19 is then attached to the end of the barrel extension 17. Alternatively, the flat surface holding the prism can be rotated and fixed by fixing means such as screws or any other fixing means.

FIGS. 16($a$) and ($b$) show an integrated light-mounting feature integrated with an barrel extension 17.

FIG. 16($a$) shows the use of an integral light source 8 using transparent glass as a flat surface 19 on which a stereoscopic prism 11 used in an apparatus shown in FIG. 4 is aligned. The prism 11 is glued to the glass surface and no hole is required in the glass. The light sources shown are LEDs mounted on the internal surface of the flat surface 19.

Figure 16A:
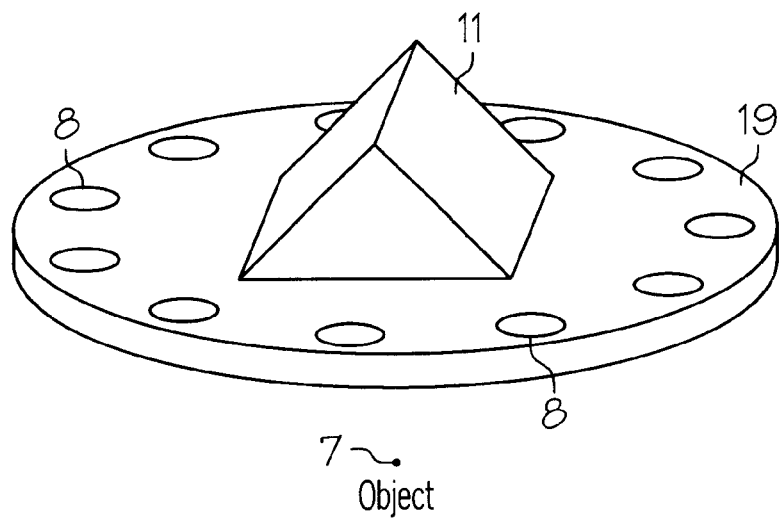
FIG. 16($a$) shows the use of an integrated light source using transparent glass as a flat surface on which a stereoscopic prism used in the apparatus shown in FIG. 14 is aligned.
Figure 16B:
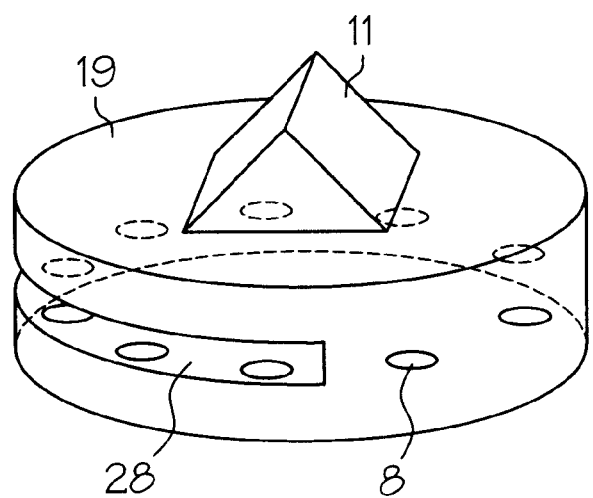

FIG. 16(b) shows an integrated light source 8 as used in an integrated light-mounting feature shown in FIG. 16 which uses an appendum of discrete LEDs or a continuous strip 28 of fiber light.

For an optical lens image formation system, this invention uses a barrel extension 17—a threaded hollow thin cylinder as shown in FIG. 15(b). At one end, a flat surface 19 with a hole 18 cut in the center is appended as shown in the FIG. 15. The placement of the prismatic device 11 centrally to the barrel 17 and the hole 18 will align the prismatic device 11 centrally.

A precise horizontal alignment of the prism is not crucial to the invention as the analytical device software can correct for minor misalignments. The diameter of the barrel 17 is made to be the same as the lens 9 with matching threads so that the barrel extension 17 can be appended to the lens 9. The length of the barrel is selected to provide the optimal depth of field when the prismatic device is used in conjunction with the telecentric lens. Alternatively, the invention uses a combination of fixed length barrel extensions or a barrel with a variable extension length.

Alternatively, this invention uses a transparent flat glass as the flat surface. The prismatic device is then glued to the surface using optical glue. In this case, there is no need to cut a hole in the center. The use of a transparent surface has an added advantage that the light source can be integrated in the barrel and shining through this transparent flat as shown in FIGS. 16(a) and (b).

Stereo Image Beam Splitter Mounting Feature

This invention utilises a prismatic device instead of sets of mirrors or prisms for a simple and easy means of alignment. The only consideration is to physically normalise the alignment of the prismatic device relative to the imaging sensor. This is done by aligning the horizontal edge of the prismatic device at right angles to the line of sight of the imaging sensor as shown in FIG. 11. An example of a skewed alignment is shown in FIG. 10.

Stereo Image Beam Splitter Rotational Feature

Figure 17:
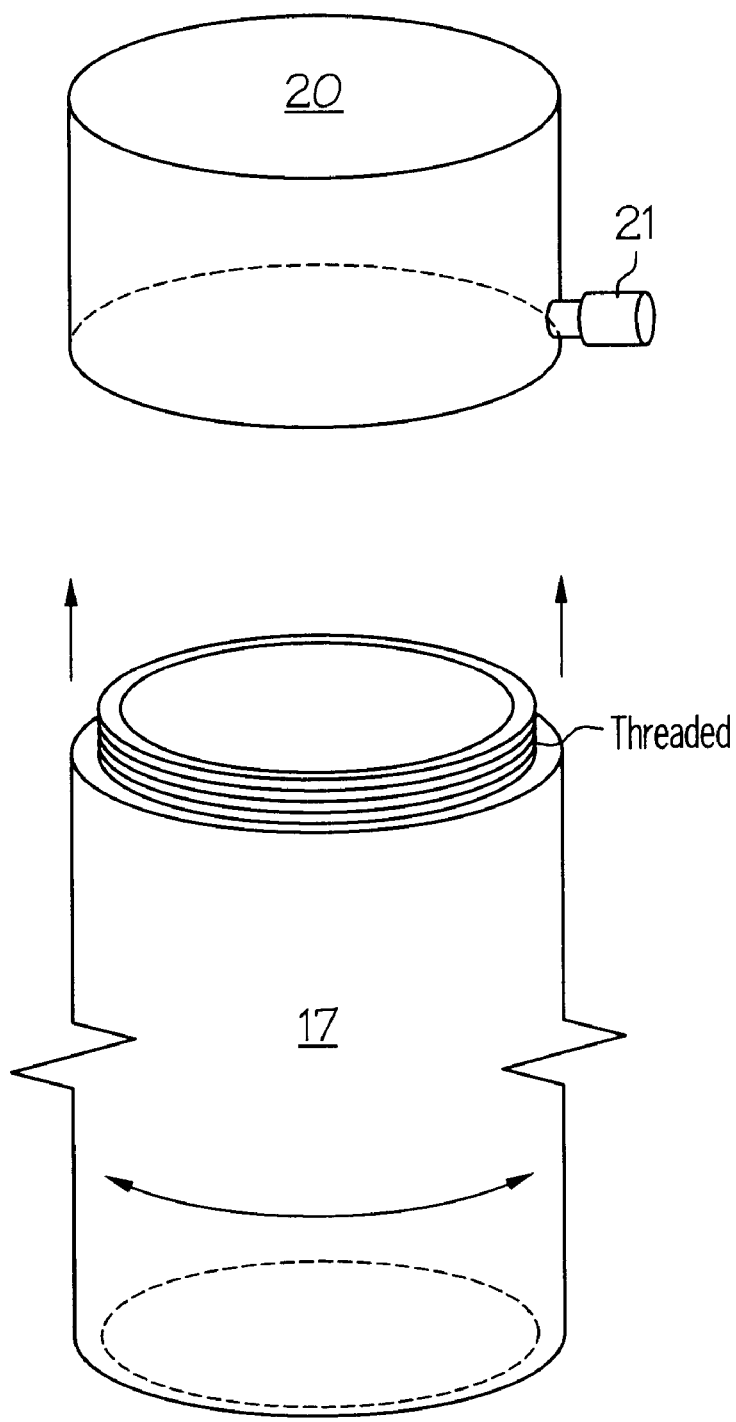
FIG. 17 shows the use of two concentric barrel extensions to allow for the rotation of the stereo image beam splitter shown in FIG. 4.

This invention also provides a feature for horizontal orientation alignment. This invention has an optical feature to allow for rotation of the stereo image beam splitter relative to the image sensor. The barrel extension of this invention is made up of two interleaved concentric halves 17, 20 with a locking screw 21 to lock the rotational orientation. This is shown in FIG. 17.

Alternatively, the invention can search in the orthogonal direction by software for the CPP once the stereo image beam splitter is mounted and the orientation is fixed.

As an alternative to the bi-image beam splitter discussed above as means for generating multiple parallel bundles of parallel light rays multi-beam splitter may be employed.

Tri-image Beam Splitter Feature

Figure 18:
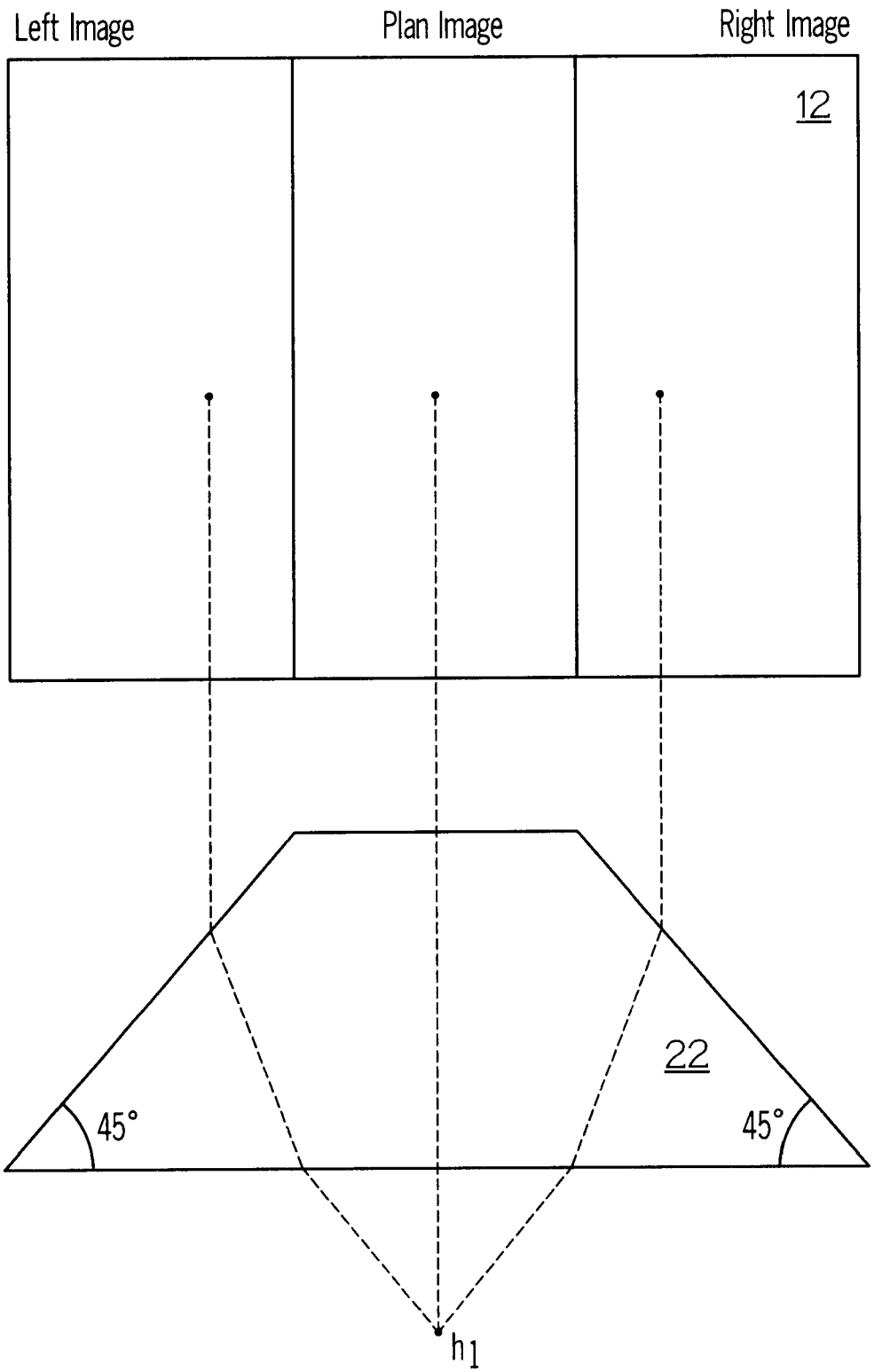
FIG. 18 shows the use of a tri-image beam splitter in an apparatus according to the invention.

This invention includes a feature to obtain triple views using a tri-image beam splitter 22 or dove prism as shown in FIG. 18. An additional face parallel to the horizontal base is made on the prismatic device. This additional face provides the plan image view. As before, the tri-image beam splitter splits the images into the stereo pair and includes in the center of the image the plan image as shown in FIG. 18. Although a dove prism is readily available as an optical device to rotate images, this invention uses the dove prism concept in a novel manner to split a single view of an object three ways.

Figure 19:
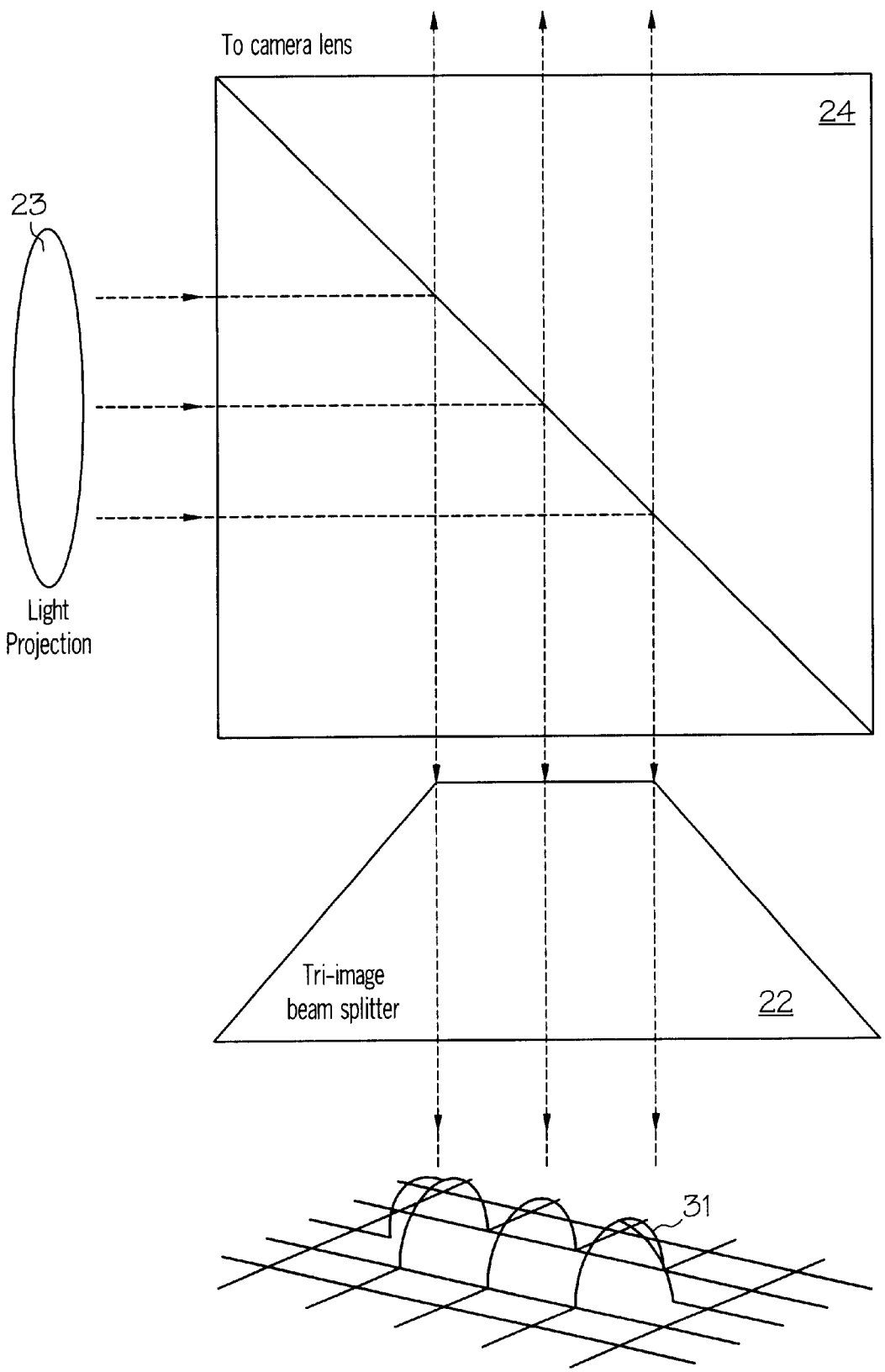
FIG. 19 shows the use of a coaxial beam splitter in an apparatus according to the invention to allow for light projection through the plan surface of the tri-image beam splitter shown in FIG. 18.

FIG. 19 shows the use of a coaxial beam splitter 24 in an apparatus according to the invention to allow for light projection through the plan surface of the tri-beam splitter shown in FIG. 18. The light pattern is projected by means of a light projector 23 from the left and into the coaxial beam splitter 24. When the projected pattern is cast on the object, the left and right image as well as the plan image can simultaneously view the object.

Quad-image Beam Splitter Feature

Figure 23:
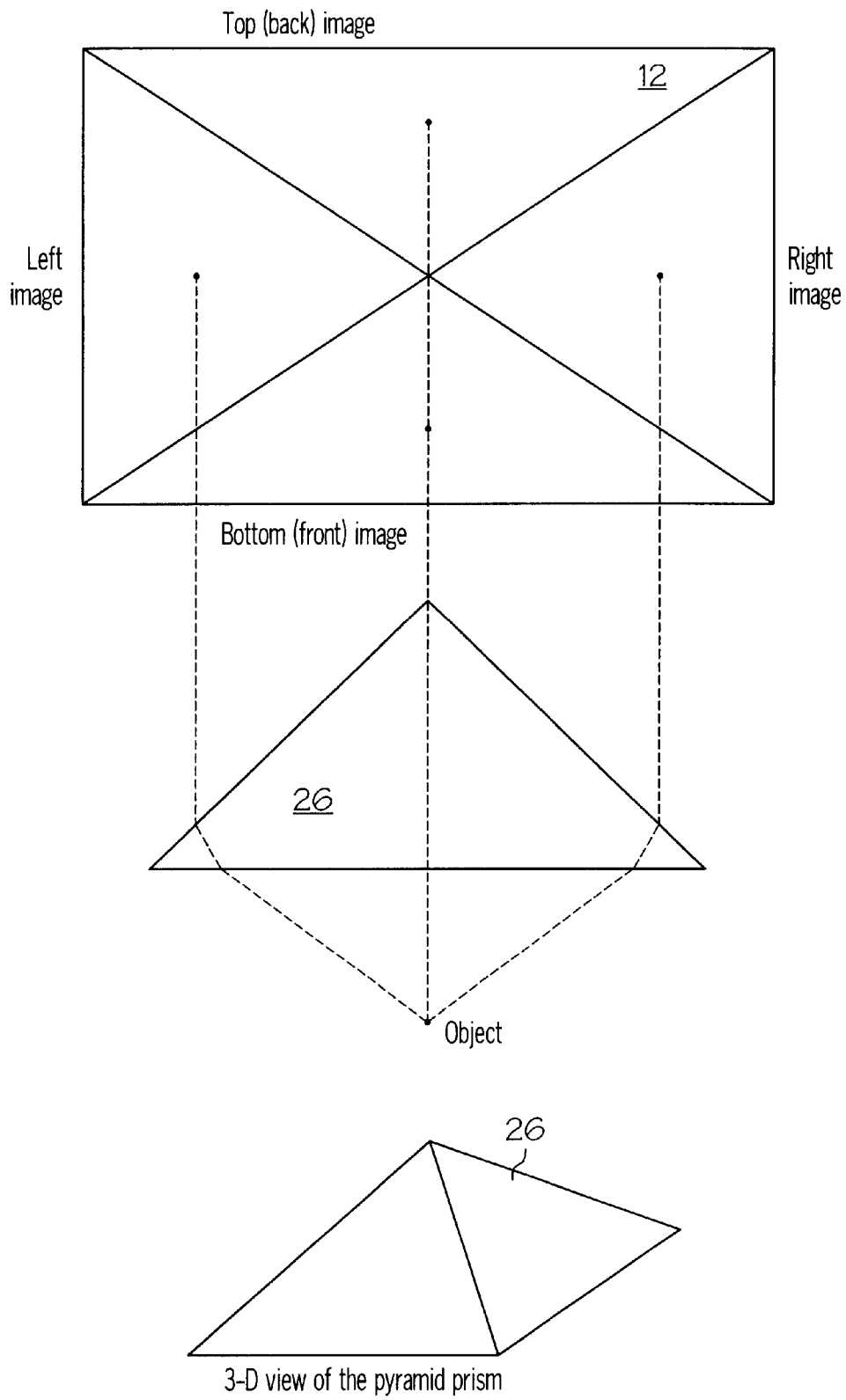
FIG. 23 shows the use of a quad-image pyramidal beam splitter.

The invention can be further expanded with the use of a pyramidal prism as shown in FIG. 23 which shows the use of a equal-image pyramidal beam splitter 26. The beam splitter 26 splits the view of the object into four images allowing the viewing of both horizontal and vertical profiles simultaneously. The additional two views is equivalent to rotating the prism by 90 degrees to obtain the stereo image of the other 2-D axis.

The resultant images are shown in the FIG. 23. The invention using the quad-image image splitter is able to easily compute CPD with both horizontal and vertical profiles without any physical rotation of any part of the invention.

Penta-image Beam Splitter Feature

Figure 24:
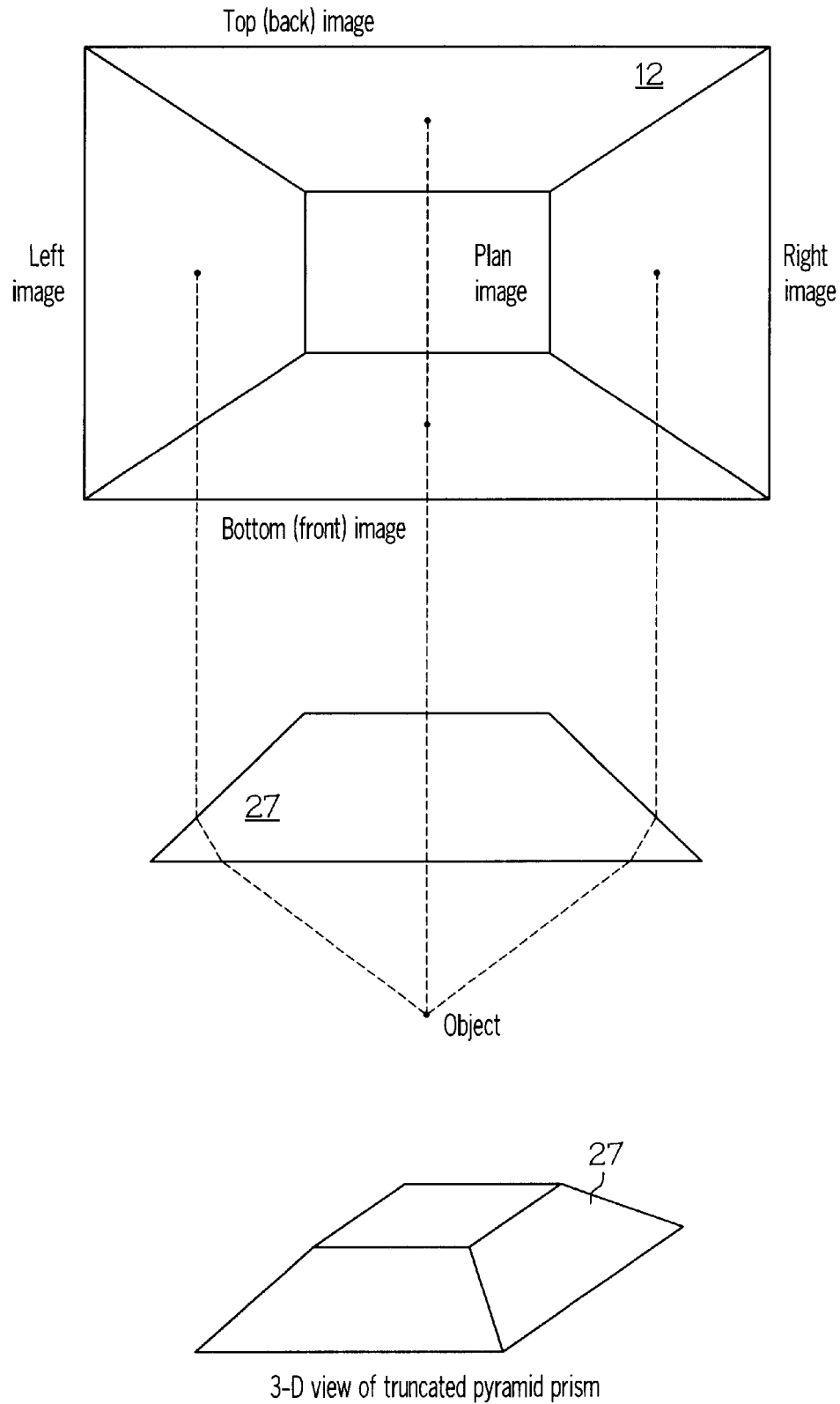
FIG. 24 shows the use of a penta-image truncated pyramid prism.

The invention produces a penta-image with the truncation of the apex of the pyramidal prism as shown in FIG. 24. This is similar to the tri-image beam splitter with an addition of two orthogonal faces to produce two orthogonal views as shown in the FIG. 24. Five images are produced with the fifth being the plan view of the object.

The use of the penta-image beam splitter 27 is similar to the tri-image beam splitter in that the horizontal face of the prism can be used for plan viewing and for light projection as described in the next section.

Light Projection Feature

This invention also provides an alternate use of any face of the prism in a novel way. Instead of solely viewing through that face, patterns of light can be projected through one or more faces of the prismatic device onto the object plane or surface.

For instance, a dot beam, a line of light or a grid can be projected onto the object surface through the stereo of tri-image beam splitter device. These light patterns are used for object analyses using the analytical device. For instance, by projecting a grid light pattern onto a featureless and regular surface from the top surface, the reflected ray of light can be viewed simultaneously by all three faces for analyses. This feature is useful for objects without prominent features, for instance a smooth and untextured curved surface with bulges such as shown in FIG. 19.

If the light projection is co-axial in nature and the light of sight of the image formation system, the invention can incorporate an additional beam splitter 24 for co-axial light projection as also shown in FIG. 19.

Height Profiling Using Light Projection

Figure 30:
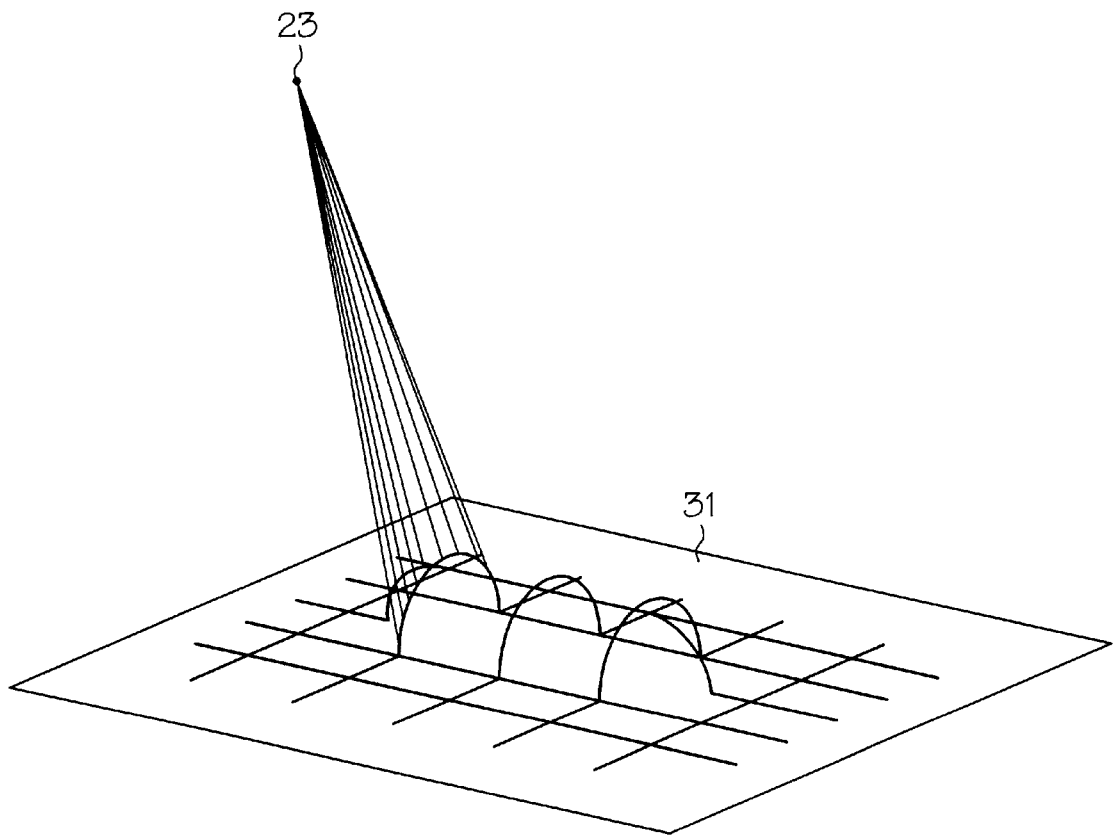
FIG. 30 shows the line projected onto the surface of a leaded semiconductor device with bumps.

FIG. 30 shows a 3-D view of a straight line projected from a line projector 23 onto a flat surface with a curved bump 31. For simplicity, the line projection in this example is normal to and directly on top of the bump. Only this reflectance of the projected light, that is the hump of the bump 31 and the two adjacent straight profiles can be seen, as the rest of the object is not lighted up and in darkness. The adjacent profiles are straight, as there is no height variation on the surface.

Figure 31:
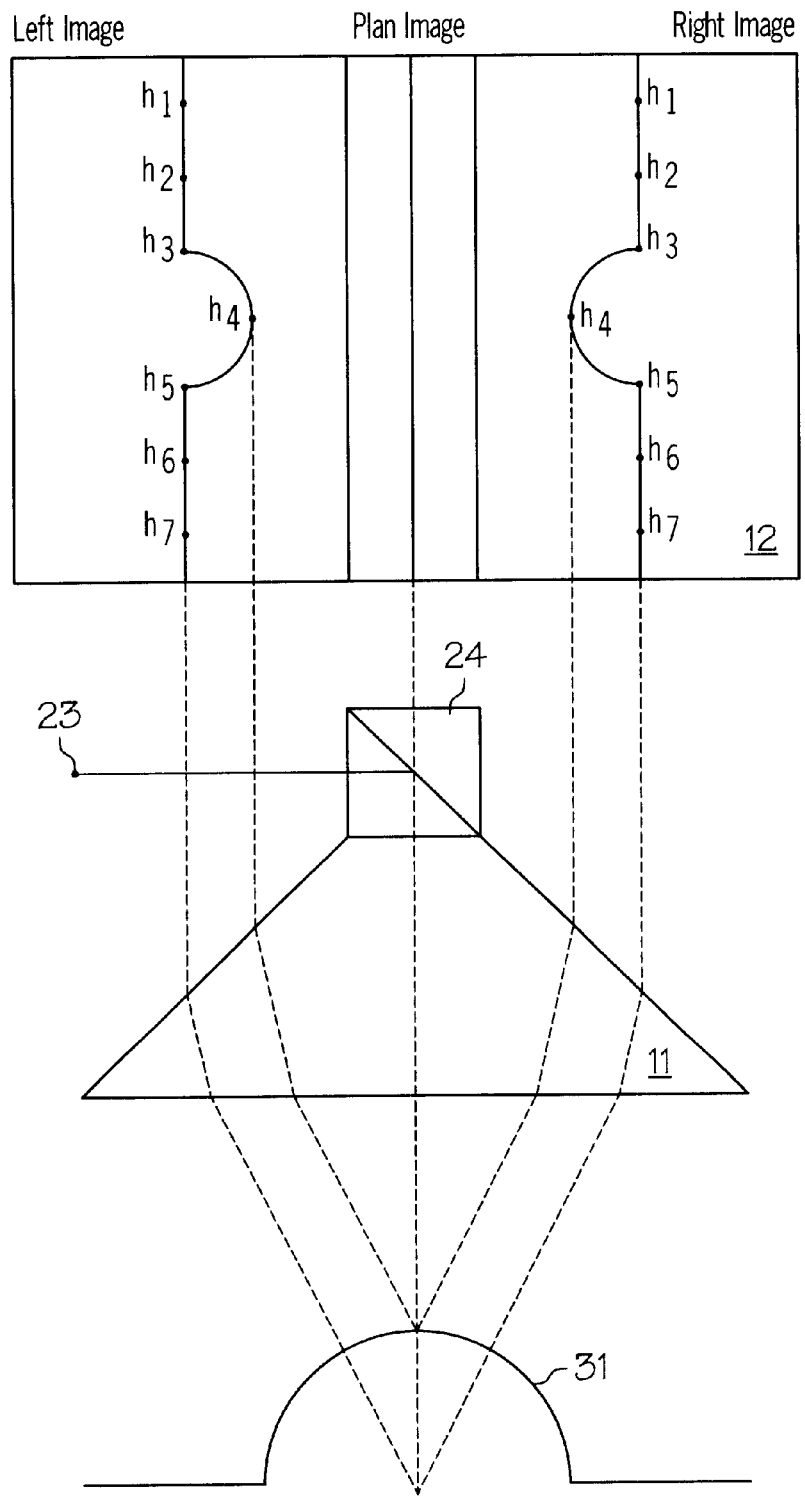
FIG. 31 shows the use of a tri-beam splitter with an integrated light projection system in an apparatus according to the invention.

If one is to view the line projection using the invention with the tri-beam image splitter 22 as shown in FIG. 31, three images will be seen. The three images are the plan image, the left and right images. In this example of the invention, the size of the light projection beam splitter 24 is made very narrow and is integrated onto the top of the tri-image beam splitter 22 as shown.

The plan image will show a straight line, as the bump is not differential from the plan image. However, the two side images will see a bent height profile as shown. The higher the bump, the shorter the CPD between the pair of CPP.

Thus as before, using the methodology as described in the invention, the complete height profile of a projected line on the surface can be extracted. Thus, the height profile of the surface can be inferred.

The invention also caters for the projection of multiple lines, grids or patterns onto surfaces or objects. Finding the corresponding CPPs and calculating the CPDs would produce the measured 3-D data.

Figure 32:
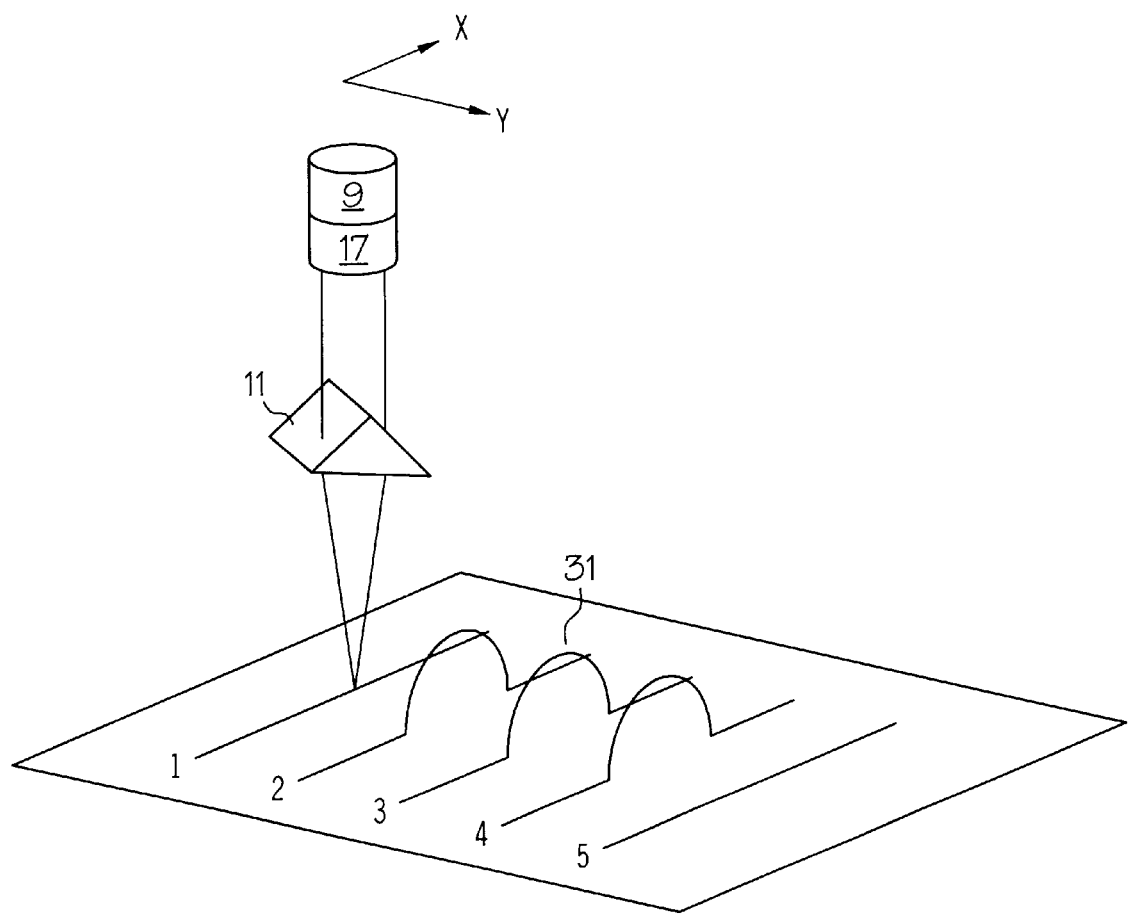
FIG. 32 shows the use of incremental scanning along the horizontal axis in a method according to the invention.

Alternatively, the apparatus according to the invention can be attached to a single axis motorised system and moved along the horizontal axis to provide 3-D-line profile measurements in incremental steps as shown in FIG. 32. Thus a composite 3-D image can be formed by scanning across an entire area.

An application of this invention is the inspection of surface flatness of an area. If the area is flat, there will not be any deviation from the expected CPDs of the projected line.

Height Profiling of Ball Grid Array Using Light Projection

Figure 33A:
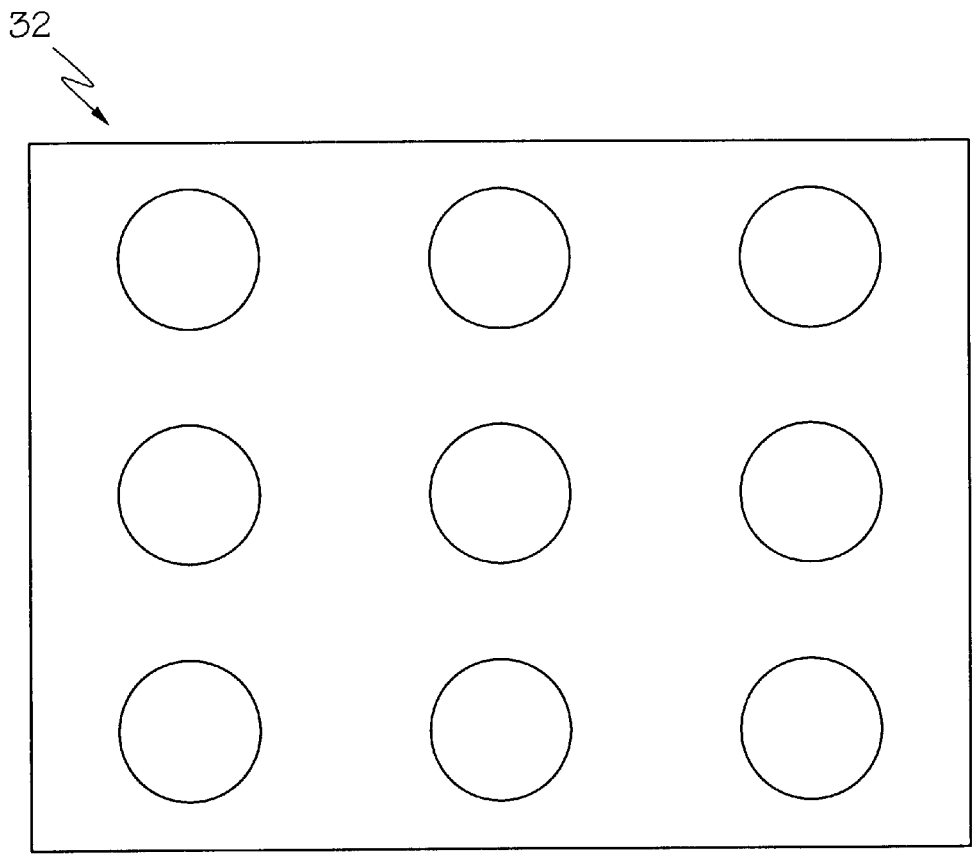
FIGS. 33($a$) and ($b$) shows schematically a plan view and a perspective view of a ball grid array (BGA) with an array of solder balls and FIG. 34 shows the height profiling of a BGA by using the method according to the invention incorporating a line projection.
Figure 33B:
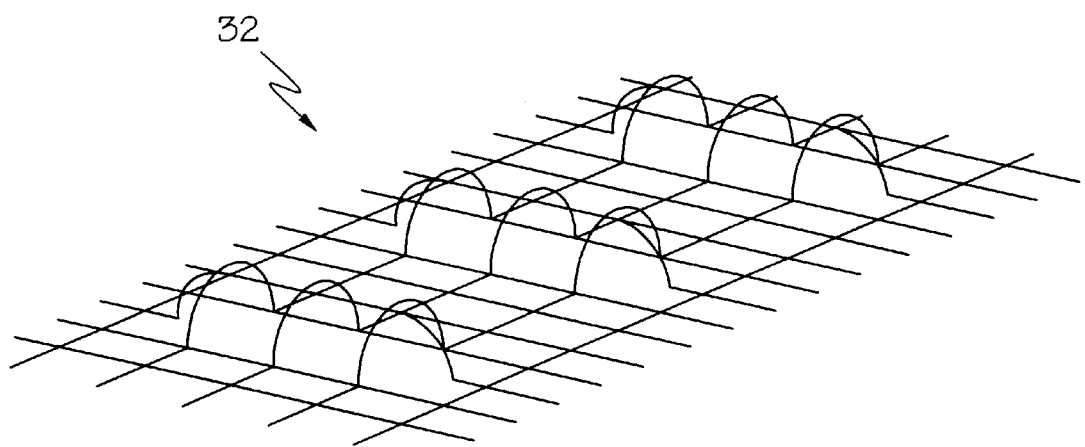

FIG. 33(a) shows a plan view of a Ball Grid Array (BGA) consisting of an array of solder balls on a flat carrier plane; and FIG. 33(b) a corresponding schematic perspective view.

Figure 34:
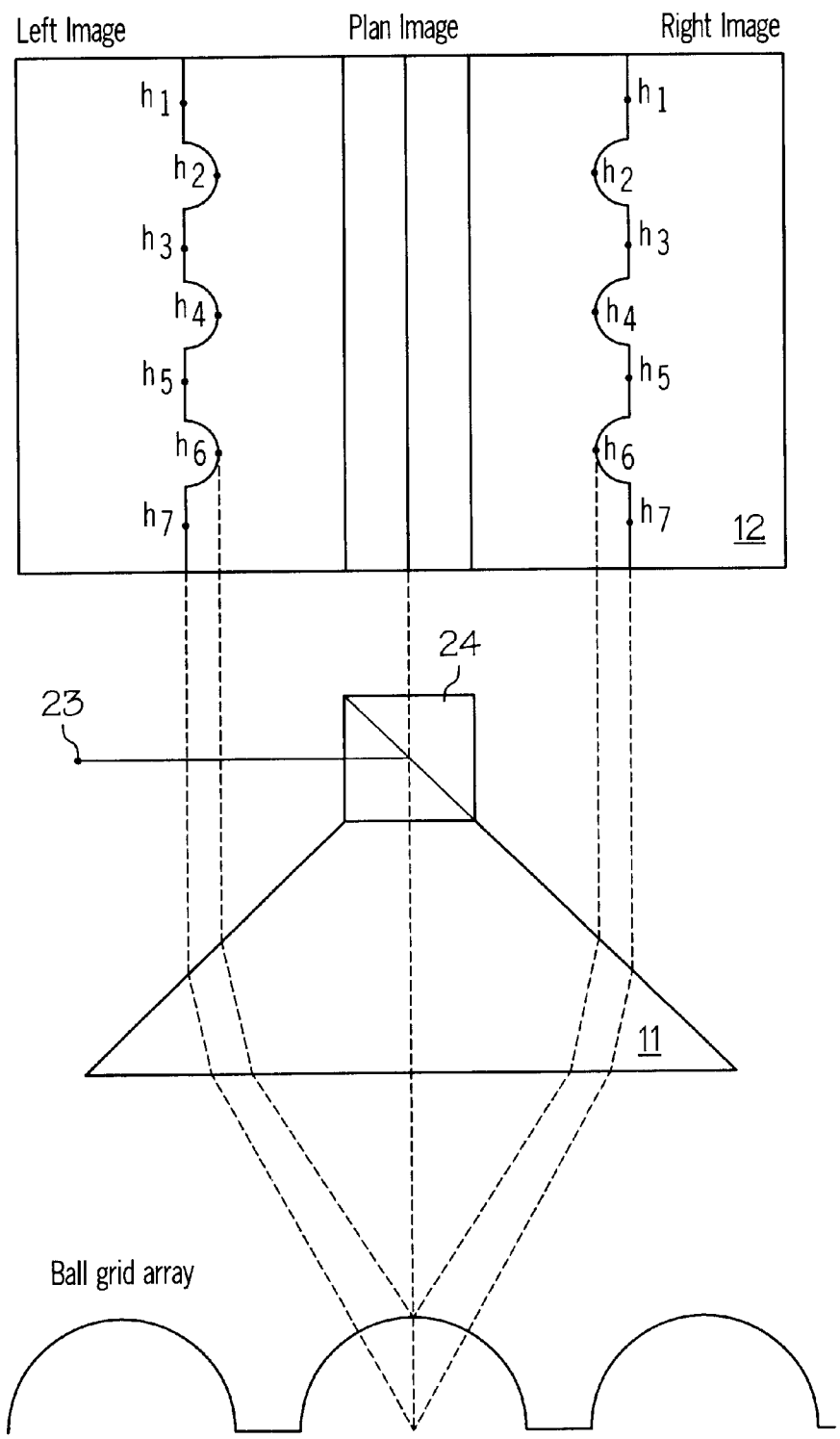

FIG. 34 shows the height profiling of a BGA by the invention incorporating a line protection.

A preferred embodiment of the invention utilises a projected line of light and a motorised system to scan across the surface of the BGA. As before, calculating the CPPs and the CPDs of various points along the horizontal or orthogonal axis would result in the 3-D measurements of the height of each ball in the array as shown in FIG. 34. Scanning across the surface of the BGA in incremental steps as shown in FIG. 32 will build up the 3-D-height profile of the BGA.

In this invention, the horizontal axis resolution of the 3-D image depends on the fineness of the incremental steps, i.e. the smaller the steps, the higher the horizontal resolution. The vertical axis resolution is proportional to the amount of sampling points on the imaging sensor. The more points are sampled and the nearer the placement of each point, the higher the resolution.

The height resolution is dependent on the magnification of the image. The larger the magnification, the larger the variation in the CPD for the same physical height. Alternatively, increasing the differential angle (FIG. 6) will also increase the variation in the CPD and the height resolution. For instance, if the differential angle is increased from 45 degrees to 50 degrees.

What is claimed is:

1. An apparatus to optically measure three-dimensional data of an object to be viewed, comprising:
   a light source (8) for illuminating an object to be viewed,
   a means (11, 22, 26, 27) for generating multiple parallel bundles of parallel light rays, each of said parallel bundles of parallel light rays containing image information of the illuminated object (7) to be viewed and said parallel bundles of parallel light rays being separated from each other,
   means (9, 17) for collecting the light rays in said parallel bundles of parallel light rays and directing them on an imaging means;
   an imaging means (2) for generating images of the parallel bundles of parallel light rays, wherein each image corresponds to one specific parallel bundle of parallel light rays and wherein the generated images are separated from one another in a two-dimensional imaging area (12) describable by a set of two coordinate axes;
   an analyzing device (10) for extracting length, width and height information of the object (7) to the viewed from the coordinate values of the points of incidence of corresponding light rays originating from the very same point ($h_1$–$h_5$) of the object to be viewed but travelling in different bundles of parallel light from the object to said two-dimensional imaging area (12).

2. An apparatus according to claim 1, wherein a bi-image beam splitter (11), a tri-image beam splitter (22), a quad-image beam splitter (26) or a penta-image beam splitter (27) is used as a means for generating multiple parallel bundles of parallel light rays.

3. An apparatus according to claim 2, wherein a wedge shaped prism, a truncated wedge shaped prism, a pyramidal prism or truncated pyramidal prism are used as a bi-image beam splitter (11), a tri-image bam splitter (22), a quad-image beam splitter (26) or a penta-image beam splitter (27), respectively.

4. An apparatus according to claim 1, wherein a telecentric lens (9), a Macro optical lens or a telecentric lens of variable magnification is used as means for collecting the light rays in said parallel bundles of parallel light rays.

5. An apparatus according to claim 1, wherein an image sensor comprising individual pixel elements which are sensitive to visible light and/or infra-red light and/or ultraviolet light and/or x-rays is used imaging means for generating images of the incident parallel bundles of parallel light rays.

6. An apparatus according to claim 1, wherein the image sensor is a video camera (2), a line scan camera, a CCD-camera or an x-ray imaging sensor.

7. An apparatus according to claim 1, wherein a computational machine is used as analyzing device (10) for extracting length, width and height information of the object to be viewed.

8. An apparatus according to claim 1, wherein means (9, 17) for generating multiple parallel bundles of parallel light rays are provided which are rotatable relative to imaging means (2) for generating images of the incident parallel bundles of parallel light rays.

9. An apparatus according to claim 1, wherein a monochromatic light source (8) for illuminating the object to be viewed or wherein a blue monochromatic light source, a red monochromatic light source and a green monochromatic light source are used for illuminating the object (7) to be viewed.

10. An apparatus according to claim 1, wherein said light source (8) is integrated within a housing of said means (9) for collecting the light rays in said parallel bundles of parallel light rays and directing them on an imaging means and arranged in a predetermined spatial relation relative to said means for generating multiple parallel bundles of parallel light rays.

11. A method to optically measure three-dimensional data of the object to be viewed, comprising the steps of:
   illuminating an object (7) to be viewed;
   generating multiple parallel bundles of parallel light rays, each of said parallel bundles of parallel light rays containing image information of the illuminated object (7) to be viewed and said parallel bundles of parallel light rays being separated from each other;
   collecting the light rays in said parallel bundles of parallel light rays;
   generating images of the parallel bundles of parallel light rays, wherein each image corresponds to one specific parallel bundle of parallel light rays and wherein the generated images are separated from one another in a two-dimensional imaging area (12) described by a set of two coordinate axes;

extracting length, width and height information of the object to be viewed from the coordinate values of the points of incidence of corresponding light rays originating from the very same point of the object to be viewed but travelling in different bundles of parallel light from the object to said two-dimensional imaging area.

12. A method according to claim 11, wherein a reference object (13, 14, 15) of known dimensions is placed at a predetermined distance from the means (11, 22, 26, 27) for generating multiple parallel bundles of parallel light rays in order to provide calibration coordinate values in said two-dimensional imaging area (12) which serve as gauge for objects of unknown dimensions to be viewed.

13. A method according to claim 12, wherein the reference object is of a parallelpiped block-like, a wedge-shaped or a double wedge shaped form.

14. A method according to claim 2, wherein prominent features of a reference object are analyzed and stored in said analyzing device (10) and the data of objects to be viewed are compared to the data obtained for the prominent features of said reference object.

15. A method according to claim 2, wherein said analyzing device (10) determines the two dimensional coordinate data of points of incidence of corresponding light rays in different ones of the multiple images originating from the same point of the object to be viewed and calculates the distance (CPD) between said points of incidence.

16. A method according to claim 2, wherein the imaging means (2) is moved relative to the object (7) to be viewed and scans said object.

17. A method according to claim 2, wherein the values determined for the dimensions of the object (7) to be viewed are compared with a set of predetermined dimension values of a reference object and wherein based on the result of the comparisons at least one attribute value out of a set of predetermined attribute values is assigned to the object to be viewed.

18. A method according to claim 17, wherein said object (7) to be viewed is further manipulated based on the at least one attribute value previously assigned to said object.

19. A method according to claim 2, wherein a bi-image beam splitter (11), a tri-image beam splitter (22), a quad-image beam splitter (26) or a penta-image beam splitter (27) is used as a means for generating multiple parallel bundles of parallel light rays.

20. A method according to claim 19, wherein a wedge shaped prism, a truncated wedge shaped prism, a pyramidal prism or truncated pyramidal prism are used as bi-image beam splitter (11), a tri-image bam splitter (22), a quad-image beam splitter (26) or a penta-image beam splitter (27), respectively.

21. A method according to claim 2, wherein a telecentric lens (9), a Macro optical lens or a telecentric lens of variable magnification is used as means for collecting the light rays in said parallel bundles of parallel light rays.

22. A method according to claim 2, wherein an image sensor comprising individual pixel elements which are sensitive to visible light and/or infra-red light and/or ultraviolet light and/or x-rays is used imaging means for generating images of the incident parallel bundles of parallel light rays.

23. A method according to claim 2, wherein the image sensor is a video camera (2), a line scan camera, a CCD-camera or an x-ray imaging sensor.

24. A method according to claim 2, wherein a computational machine is used as analyzing device (10) for extracting length, width and height information of the object to be viewed.

25. A method according to claim 2, wherein means (9, 17) for generating multiple parallel bundles of parallel light rays are provided which are rotatable relative to imaging means (2) for generating images of the incident parallel bundles of parallel light rays.

26. A method according to claim 2, wherein a monochromatic light source (8) for illuminating the object to be viewed or wherein a blue monochromatic light source, a red monochromatic light source and a green monochromatic light source are used for illuminating the object (7) to be viewed.

* * * * *